United States Patent
Isaac

(10) Patent No.: US 12,556,466 B2
(45) Date of Patent: Feb. 17, 2026

(54) FIRST NODE, SECOND NODE AND METHODS PERFORMED THEREBY FOR HANDLING ANOMALOUS VALUES

(71) Applicant: Telefonaktiebolaget LM Ericsson (publ), Stockholm (SE)

(72) Inventor: Ebenezer RHP Isaac, Chennai (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 18/723,497

(22) PCT Filed: Jan. 4, 2022

(86) PCT No.: PCT/IN2022/050009
§ 371 (c)(1),
(2) Date: Jun. 24, 2024

(87) PCT Pub. No.: WO2023/131962
PCT Pub. Date: Jul. 13, 2023

(65) Prior Publication Data
US 2025/0055771 A1    Feb. 13, 2025

(51) Int. Cl.
*H04L 43/04* (2022.01)
(52) U.S. Cl.
CPC ................... *H04L 43/04* (2013.01)
(58) Field of Classification Search
CPC ......... H04L 43/04; H04L 43/16; H04L 41/06; H04L 41/0636; H04L 41/16;
(Continued)

(56) References Cited

U.S. PATENT DOCUMENTS 10,146,609 B1* 12/2018 Leverich ............... G06F 11/079
10,198,339 B2*  2/2019 Salunke ................ G06F 11/34
(Continued)

FOREIGN PATENT DOCUMENTS

CN    107528904 B    2/2020
WO    2021176460 A1   9/2021

OTHER PUBLICATIONS

"Overview of Time Series Characteristics", STAT510, Applied Time Series Analysis, 12 pages.
(Continued)

*Primary Examiner* — Jerry B Dennison
(74) *Attorney, Agent, or Firm* — Murphy, Bilak & Homiller, PLLC

(57) ABSTRACT

A method, performed by a first node (111), for handling anomalous values. The first node (111) generates (305) a respective rule for each outlier in a set of outliers. Each respective rule comprises a respective set of conditions. Each condition compares a respective value of a respective variable to a corresponding respective reference statistic for a respective context corresponding to the respective value. The first node (111) determines (306), for each generated respective rule, whether or not it matches a previously unappraised rule. The first node (111) also initiates (307) performing one of: i) with the proviso that the generated respective rule is determined to match a previously unappraised rule, adding one count, and ii) providing, with the proviso that the generated respective rule is determined to lack a match to a previously unappraised rule and to any previously appraised rule, an indication. The indication indicates the generated respective rule is unappraised.

20 Claims, 9 Drawing Sheets

(58) Field of Classification Search
CPC ............... G06F 11/079; G06F 11/3452; G06F 2201/81; H04W 24/04
See application file for complete search history.

(56) References Cited

U.S. PATENT DOCUMENTS

| | | | |
|---|---|---|---|
| 10,200,262 B1* | 2/2019 | Leverich | ............. H04L 63/1425 |
| 10,558,516 B2 | 2/2020 | Leverich et al. | |
| 10,680,875 B2 | 6/2020 | Tapia et al. | |
| 10,880,763 B1 | 12/2020 | Vela et al. | |
| 2019/0065298 A1* | 2/2019 | Leverich | ............... G06F 11/079 |
| 2020/0382361 A1 | 12/2020 | Chandrasekhar et al. | |
| 2021/0004704 A1 | 1/2021 | Dang et al. | |
| 2021/0392031 A1 | 12/2021 | Ali-tolppa et al. | |
| 2022/0038332 A1* | 2/2022 | Umakanth | .......... H04L 41/5016 |
| 2022/0376968 A1* | 11/2022 | Maskara | ................ H04L 41/142 |
| 2024/0430181 A1* | 12/2024 | Chlebus | .................. H04L 43/04 |
| 2025/0055771 A1* | 2/2025 | Isaac | ................... G06F 11/3452 |

OTHER PUBLICATIONS

Bruno, Giulia, et al., "Mining Rare Association Rules by Discovering Quasi-Dependencies: An Incremental Approach", Rare Association Rule Mining and Knowledge Discovery: Technologies for Infrequent and Critical Event Detection (/gateway/book/857), 2010, 5 pages.

Hyndman, Rob J, et al., "Section 6.6 STL decomposition", Forecasting: Principles and Practice, link: https://otexts.com/fpp2/stl.html, 3 pages.

Jaaskela, Jari, "Anomaly-Based Insider Threat Detection with Expert Feedback and Descriptions", Faculty of Information and Electronics Engineering, University of Oulu, Master's Thesis, Mar. 2020, 56 pages.

Liu, Yu, et al., "A hybrid data mining anomaly detection technique in ad hoc networks", InderScience Online, May 30, 2007, 3 pages.

Liu, Kun, et al., "An Interactive Approach of Rule Mining and Anomaly Detection for Internal Risks", SpringerLink, Conference Paper, pp. 365-376, 9 pages.

Lundberg, Scott M, et al., "A Unified Approach to Interpreting Model Predictions", arXiv:1705.07874v2 [cs.AI], Nov. 25, 2017, 10 pages.

Molnar, Christoph, "Global Surrogate", Interpretable Machine Learning, Creative Commons License. Link: https://christophm.github.io/interpretable-ml-book/global.html, Sep. 2021, 7 pages.

Prathibhamol, C.P, et al., "Anomaly detection based multi label classification using Mining (ADMLCAR)", Conference Paper, 2016 Intl. Conference on Advances in Computing, Communications and Informatics (ICACCI), Sep. 21-24, 2016, 6 pages.

Ribeiro, Marco Tulio, et al., ""Why Should I Trust You?" Explaining the Predictions of Any Classifier", arXiv:1602.04938v3 [cs.LG], Aug. 9, 2016, 10 pages.

Steenwinckel, Bram, et al., "Flags: A methodology for adaptive anomaly detection and root cause analysis on sensor data streams by fusing expert knowledge with machine learning", ScienceDirect, Future Generation Computer Systems, vol. 116, Mar. 2021, pp. 30-48.

Tsang, Chi-Ho, et al., "Genetic-fuzzy rule mining approach and evaluation of feature selection techniques for anomaly intrusion detection", ScienceDirect, Pattern Recognition 40, 2007, pp. 2373-2391.

\* cited by examiner a)

b)

a)

b)

FIRST NODE, SECOND NODE AND METHODS PERFORMED THEREBY FOR HANDLING ANOMALOUS VALUES

TECHNICAL FIELD

The present disclosure relates generally to a first node and methods performed thereby, for handling anomalous values. The present disclosure relates generally to a second node and methods performed thereby, for handling anomalous values. The present disclosure also relates generally to a computer programs and computer-readable storage mediums, having stored thereon the computer programs to carry out these methods.

BACKGROUND

Computer systems in a communications network may comprise one or more nodes, which may also be referred to simply as nodes. A node may comprise one or more processors which, together with computer program code may perform different functions and actions, a memory, a receiving port and a sending port. A node may be, for example, a server. Nodes may perform their functions entirely on the cloud.

Anomaly Detection

The performance of a communications network may be measured by the analysis of data indicating its performance, such as, for example, Key Performance Indicators (KPIs). To be able to assess the performance of the communications network, it may therefore be useful to identify if there may be data that may deviate from the norm, or from the expected value, which may be implemented by analyzing the presence of outlier or anomalous data. Generally, the terms outliers and anomalies may be used interchangeably. However, they may differ when considered in a business context. An outlier may be understood as a rare occurrence that may differ significantly from the majority of data under observation, whereas an anomaly may be understood as a significant deviation from the expected occurrence. Not all data points that are outliers may conform as anomalies; it may depend on the use case. For example, if the number of active uplink users are measured, there may be a peak in the number of uplink users during a tournament sports event, that may considerably deviate from the mean number of uplink users. While, statistically, this peak may be considered an outlier value, from a use case perspective, it may not be considered an anomaly. Hence, outlier detection may be understood to look at data from a statistical standpoint, while Anomaly Detection (AD) may be understood to consider it from a use case perspective.

When it comes to time series, AD may become even more of a challenge due to seasonality and trend [1]. Seasonality may be understood as a property of a time series data that may cause the data to exhibit different ranges at different parts of a period. The period may be of any granularity such as day, week, month or even a year. Trend may be understood as the upward or downward movement of averages across a certain timeframe.

An AD pipeline for time series data is depicted in FIG. 1. First, the features from the data that may relate to the anomalies under consideration may be selected for processing. The pre-processing step may involve feature engineering and then removal of seasonal and trend [1] components through seasonal decomposition such as Seasonal and Trend decomposition using Locally Estimated Scatterplot Smoothing (STL) [2]. One the selected feature may have been pre-processed, it may be passed through an outlier detector, that is, it may be fed to the outlier detection algorithm, which may return scores. Generally, an outlier detector may provide scores on top of which a threshold may be set to determine outliers or to flag anomalies. An AD model may generally imply both the outlier detector and thresholding taken together. In the context of this document, the output of an AD model may be understood to refer to the outliers that may be determined after the thresholding step. The anomalies of flags may then be filtered by some heuristic or rules to fit the use case need, that is, according to the use case to report the final anomalies.

The scope of this disclosure may be understood to be limited to the anomaly filtering step of an AD pipeline. Anomaly filtering may be understood to involve removal of cases which may not be beneficial to the use case as false positives and may involve gauging the severity of certain cases for better attention and assist minimizing false positives. Anomaly filtering may be a trivial task when the input data may be univariate. The appropriate action may be to group the occurrences based on statistical similarity and assess them on a case-by-case basis. However, when the data is multivariate, filtering is not straightforward. Multivariate AD algorithms may model complicated anomalies but cannot directly explain why they occur. In a practical scenario, e.g., network Key Performance Indicator (KPI) fault detection, if the reason as to why a certain KPI combination is anomalous is unknown, then the issue causing the anomaly cannot be addressed. Therefore, explainable AD may be understood to be important for managing a communications network. Methods known for explaining ML models include SHAP [3], LIME [4] and surrogate model [5].

A surrogate decision tree may retrofit features of a dataset with the outputs the AD algorithm as labels. A decision tree model may be fit to a dataset using the anomalies predicted by an anomaly detector as labels in the hope that the rules thus generated by the decision tree may give insights as to how the anomaly detector may have made its decisions. Since the model fit may not show what the anomaly detector may be actually doing, this may be considered a 'retrofit', rather than an actual fit. A standard decision tree may be given a dataset with true labels as input. A surrogate decision tree may be understood as a decision tree that may take in the dataset with labels of another model. A surrogate model may therefore be understood to attempt to interpret the AD model based on the combination of the training dataset and the output provided by the AD. Although a standard decision tree may be broken down into a set of rules, the rules obtained from a surrogate decision tree may not depict the complete behavior of the model itself as there may exist a combination of data that may not be included as part of the training set. In other words, a surrogate tree may only try to explain, based on the anomaly detector and based on what the tree may have seen in the training set. It may not account to all decisions that the anomaly detector may make beyond the training set, e.g., in production. If the surrogate decision tree were to be allowed to retrain, the generated rules may possibly vary widely from the previous version. Hence, the ruleset obtained from a surrogate model may be understood to not be definite. The rules generated from a training set by a surrogate tree may be understood to not be definite as they may not generalize to unseen decisions made by the anomaly detector in the future. If further decisions made by the anomaly detector were to be appended to the training set and the surrogate model were to be retrained with the same, there may be changes to make a completely different rule set as opposed to the previous rule set. Hence, such a ruleset may not be reliable to explain anomalies.

Explanators such as LIME and SHAP may depict feature importance for a given prediction. These methods may help to understand which features may participate in the occurrence of a given anomaly on a per-case basis. However, they do not formulate generalizable rules that may be assessed by an expert. Rules generated from a training dataset may be understood to need to be generalizable so that they may still hold true to future circumstances. In the case of LIME and SHAP, they may only gauge feature importance but they may not provide definite rules to show how their values may indicate the occurrence of an anomaly. For example, they may show that a set of variables such as, e.g., d, c, and f significantly contribute to an anomaly, based on the training set, but they cannot indicate whether they are lesser than or greater than the norm to create rules that may be verified by an expert.

For example, in a Radio Access Network (RAN), it may be understood to be normal for monitoring KPI, such as e.g., handover rate, to spike up when load KPI, such as Active Users, may be high. Even if such an occurrence is an outlier in statistical terms, it may need not be considered as a network anomaly when the use case objective may be to identify faulty behavior of network cells. In a system of multiple load and monitoring KPIs, many of such combinations that may not support the use case objective may occur and may be flagged as anomalies by a typical multivariate outlier detection algorithm. An explanator may only show the different levels of importance that each feature may have on such occurrences, albeit they may be considered as false positives in the use case context.

There is a knowledge gap between the user of the system and the AD system itself that may require bridging to make its use more fruitful and to enable better automation.

Association rule mining may be understood as a process of analyzing co-occurrences in data to generate if-then rules, e.g., how certain products may be likely bought together at a store, such that if an individual buys product A, then the same individual is likely to also buy B. Anomaly detection with association rule mining has been discussed in previous work, as briefly summarized next.

Prathibhamol et al. [6] proposed the use of AD and association-rule mining as a means for multilabel classification. The method involves clustering the data first using k-means clustering, followed by oversampling Principal Component Analysis (PCA) for anomaly detection, then frequent itemset matching to associate class labels. Although the solution involves the use of unsupervised learning techniques, the scope is limited to supervised learning.

Tsang et al. [7] approached an anomaly Intrusion Detection System (IDS) with genetic-fuzzy rule mining. Genetic-fuzzy rule mining may be understood to be comprised under fuzzy logic, a branch of Artificial Intelligence (AI) which may be understood to concern real-values that may range between true and false, as e.g., explained in [7]. Their solution generated fuzzy if-then rules through an agent-based evolutionary framework. These rules aimed to map the normal operating conditions of the system to detect intrusion detection. Although these rules were interpretable, the genetic algorithm employed was based on fitness functions that relied on classification accuracy meaning that it expected anomalies to be labelled beforehand, ultimately limiting its scope to supervised learning.

Yu Liu et al. [8] also designed an IDS using AD based on association-rule mining. The solution profiled normal activity by observing the network audit logs and triggered an anomaly when the support and audit logs were high. The limitation is that the generated rules were based on static thresholds. The authors also limited the scope to a node-based IDS, not network-based. Given a large network of varying contexts, such a method may not suitable.

G. Bruno et al. [9] considered anomalies as rare association rules that violate dependencies that frequently hold. In a classic frequent-itemset-matching problem of association rule mining, if certain items occur frequently together they may be assumed to form a dependency between them. Hence, rules may be formed on the basis that these dependencies may hold by virtue of their frequency in the dataset. G. Bruno et al. [9] considered the probable occurrence of a concept drift by maintaining an up-to-date set of such functional dependencies. The solution incrementally updated the association rules on append-only databases. Although the system itself was self-learning, it did not give scope to provide feedback to the AD system to solve specific problems that would discount anomalies that are not relevant to the use case.

The literature, mentioned so far, did not appreciate the importance of use case-specific feedback that may be provided to the system. For a given dataset, it may be possible to identify multiple anomalies that may be of importance to one problem scope but not another. Nevertheless, there may be also studies in the literature that may consider active anomaly detection that may consider human-in-the-loop feedback to improve prediction accuracy. Some of such studies are summarized in Jari's thesis [10].

A more recent work by Kun Liu et al. [11] adequately considered the expert feedback to tune AD within an information system. In here, the rules were mined for the behavior of the system based on historical data and those rules were evaluated by the expert. The method considered both frequency of occurrence of these rules through frequent itemset matching and their associated behavior. However, their rules were analogous to simple first-order logic and the solution did not discuss the handling of real values such as that of a network KPI. First-order logic, also known as predicate logic, may be understood as a collection of formal systems in mathematics that may deal with statements, variables, quantifiers and their truth. It may be understood to be an extension to propositional logic. In first-order logic, all building blocks may be based on a binary system wherein a statement may either be true or false. They do not deal with real values.

Steenwinckel et al. [12] designed a generic framework to combine AD, fault recognition and root cause analysis. The design was also considered to be context-aware, adaptive, and interpretable. It claimed to combine unsupervised AD with supervised labels provided by an expert. It did not mandate the algorithms used for each component, only that the interpretations were stored in a knowledge graph. It did not discuss how to handle multiple contexts or concept drifts. Multiple context may show situations where the operating range of variables may differ, e.g., a set of KPIs in cells of a densely populated region versus that of a sparsely populated region. The solution in ref. [12] may require building a separate rule model for each context. Also, it may be understood to be a train once and run model, in which case, if a context drift occurs, the system would have to be halted and retrained all over again to get the new rules to adapt to the change in concept.

According to the foregoing, existing methods for explaining ML models may lead to incorrect and inadequate explanation of anomalies and insufficient filtering of outlier values, and consequently, inadequate or poor management of the performance of a communications network.

SUMMARY

It is an object of embodiments herein to improve the handling of anomalous values.

According to a first aspect of embodiments herein, the object is achieved by a computer-implemented method performed by a first node. The method is for handling anomalous values. The first node generates a respective first rule for each first outlier in a set of first outliers detected in a first plurality of data. Each respective first rule comprises a respective set of first conditions. Within each respective set of first conditions, each first condition compares a respective first value of a respective first variable of a respective first outlier in the set of first outliers to a corresponding respective first reference statistic for a respective first context corresponding to the respective first value of the respective first variable for the respective first outlier. The first node also determines, for each generated respective first rule, whether or not the generated respective first rule matches a previously unappraised rule. The first node then initiates performing one of the following. According to a first option, with the proviso that the generated respective first rule is determined to match a previously unappraised rule, adding one count of occurrence of the matched previously unappraised rule. According to a second option, providing, with the proviso that the generated respective first rule is determined to lack a match to a previously unappraised rule and to any previously appraised rule, a first indication. The first indication indicates the generated respective first rule is unappraised.

According to a second aspect of embodiments herein, the object is achieved by a computer-implemented method performed by a second node. The method is for handling anomalous values. The second node generates a second rule for a second outlier detected in a second plurality of data. The second rule comprises a second set of conditions. Each second condition compares a second value of a second variable of the second outlier to a determined second reference statistic for a respective second context corresponding to the second value of the second variable of the second outlier. The second node also determines whether or not the generated second rule matches any previously appraised rule and respective assigned actions obtained from a first node. The second node then initiates performing one of the following. According to a first option, with the proviso that the generated second rule matches at least one of the previously appraised rules, the respective assigned action. According to a second option, with the proviso that the generated second rule lacks a match to any of the previously appraised rules and to any previously unappraised rule, providing a third indication. The third indication indicates the generated third rule is unappraised.

According to a third aspect of embodiments herein, the object is achieved by the first node. The first node is for handling anomalous values. The first node is configured to generate the respective first rule for each first outlier in the set of first outliers configured to be detected in the first plurality of data. Each respective first rule is configured to comprise the respective set of first conditions. Within each respective set of first conditions, each first condition is configured to compare the respective first value of the respective first variable of the respective first outlier in the set of first outliers to the corresponding respective first reference statistic for the respective first context configured to correspond to the respective first value of the respective first variable for the respective first outlier. The first node is also configured to determine, for each generated respective first rule, whether or not the generated respective first rule matches a previously unappraised rule. The first node is also configured to initiate performing one of the following. According to the first option, with the proviso that the generated respective first rule is determined to match a previously unappraised rule, adding one count of occurrence of the matched previously unappraised rule. According to the second option, providing, with the proviso that the generated respective first rule is determined to lack a match to a previously unappraised rule and to any previously appraised rule, the first indication. The first indication is configured to indicate the generated respective first rule is unappraised.

According to a fourth aspect of embodiments herein, the object is achieved by the second node. The second node is for handling anomalous values. The second node is configured to generate the second rule for the second outlier configured to be detected in the second plurality of data. The second rule is configured to comprise the second set of conditions. Each second condition is configured to compare the second value of the second variable of the second outlier to the determined second reference statistic for the respective second context configured to correspond to the second value of the second variable of the second outlier. The second node is also configured to determine whether or not the generated second rule matches any previously appraised rule and respective assigned actions configured to be obtained from the first node. The second node is also configured to initiate performing one of the following. According to the first option, with the proviso that the generated second rule matches at least one of the previously appraised rules, the respective assigned action. According to the second option, with the proviso that the generated second rule lacks a match to any of the previously appraised rules and to any previously unappraised rule, providing the third indication. The third indication is configured to indicate the generated third rule is unappraised.

By generating the respective first rule for each first outlier, the first node may map each detected first outlier, according to its statistical characteristics with reference to the ones that are not anomalous, to unique rules which may be generalizable. The generated rules may be understood to be generalizable in the sense that they may be understood to hold true to future circumstances of unseen data and multiple contexts. The rules may be understood to generalizable because they may be understood to be a set of simple context-sensitive comparisons with reference statistics. A reference statistic may be understood to be persisted for each active context of the multiple contexts in the system.

By mapping anomalies to rules, the first node may then be enabled to associate anomalies with the necessary steps to take as a response to its occurrence. Each rule may be associated to a sequence of actions that an operator may need to take if an anomaly matching the rule occurs.

By each respective first rule comprising a respective set of first conditions, and each first condition comparing a respective first value of a respective first variable of a respective first outlier to a corresponding respective first reference statistic for a respective first context corresponding to the respective first value, the first node may be able to generate rules that may be context-sensitive.

By determining whether or not the generated respective first rule matches a previously unappraised rule, the first node may be enabled to identify new rules, and prepare them for appraisal, as well as to filter out rules which may be too common. By initiating keeping count of the occurrence of a matched previously unappraised rule, the first node may be also enabled to determine, e.g., itself, if the occurrence of a rule is high, and may therefore be whitelisted for being too common to be considered an "anomaly", thereby reducing the number of rules to be appraised, and enabling that the filtering of outliers may be performed more efficiently, robustly, and faster.

By initiating providing the first indication if the generated respective first rule is determined to lack a match to a previously unappraised rule, the first node may enable appraisal of each rule, e.g., by an SME expert, who may then provide feedback to the first node, while reducing the number of rules to be appraised. The feedback may include accepting the rule to be anomalous and assign an appropriate response or whitelisting a rule as not anomalous. Accordingly, the filtering of detected outliers may be performed efficiently and faster, reducing the non-automated workload of the procedure.

By the second node generating the second rule for the second outlier and determining whether or not the generated second rule matches any previously appraised rule and respective assigned actions obtained from the first node, the second node may be enabled to apply, e.g., online, the appraised rules generated by the first node, to newly detected outliers. By initiating performing the respective assigned action if the generated second rule matches at least one of the previously appraised rules, the second node may be enabled to handle the occurrence of anomalies and improve the performance of the communications network, while doing this more efficiently, only for anomalies that match appraised rules. By initiating providing the third indication if the generated second rule lacks a match to any of the previously appraised rules and to any previously unappraised rule, the second node may also be enabled to detect new rules that may be generalizable, context-sensitive and robust.

BRIEF DESCRIPTION OF THE DRAWINGS

Examples of embodiments herein are described in more detail with reference to the accompanying drawings, and according to the following description.

DETAILED DESCRIPTION

Certain aspects of the present disclosure and their embodiments may provide solutions to the challenges discussed in the Background and Summary sections. There are, proposed herein, various embodiments which address one or more of the issues disclosed herein.

As a summarized overview, embodiments herein may be understood to relate to active rule mining for anomaly detection. According to embodiments herein, a node may group anomalies generated by an anomaly detector into unique rules that may be associated with an automatic response for live AD applications that may use either timeseries or independent and identically distributed (iid) data. Such rules may be advantageously formulated so that they may be generalizable, context-sensitive, and robust in the event of concept drift.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
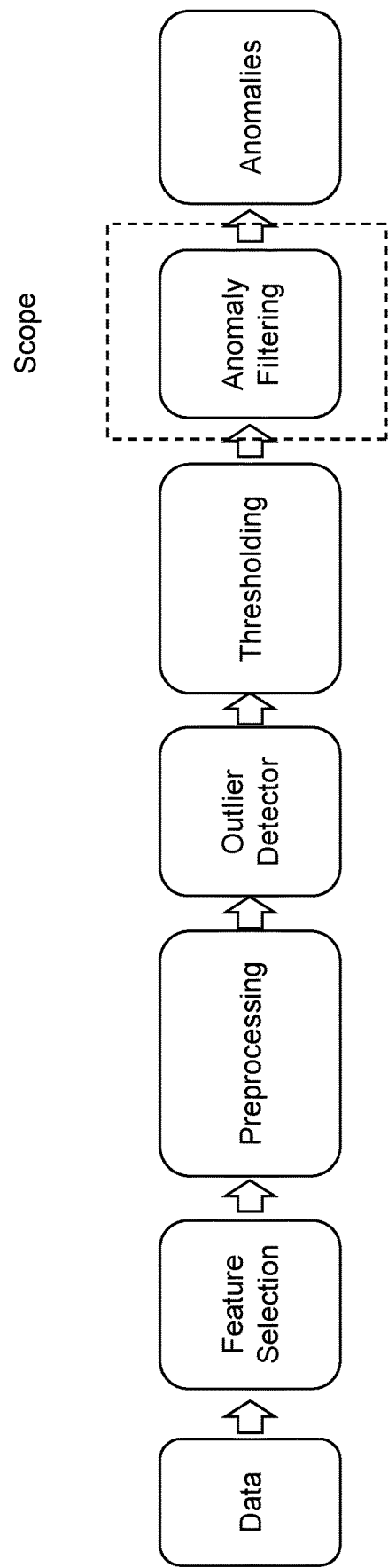
FIG. 1 is a schematic diagram illustrating an example of an AD pipeline, according to existing methods.
Figure 2:
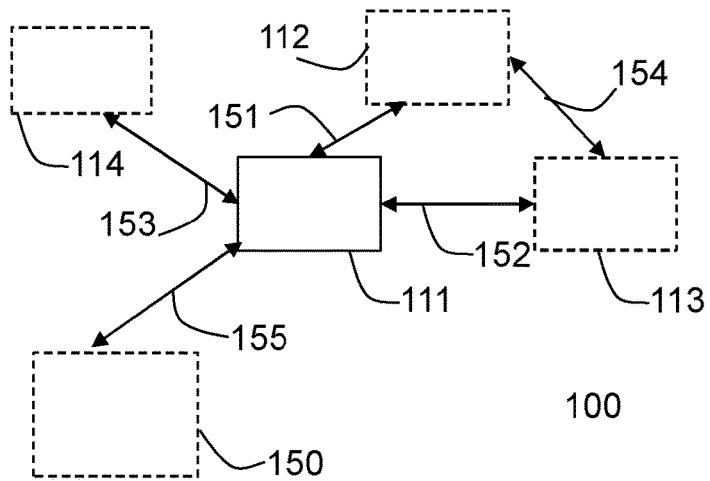
FIG. 2 is a schematic diagram illustrating two non-limiting embodiments, in panel a) and panel b) a communications system, according to embodiments herein.
Figure 2:
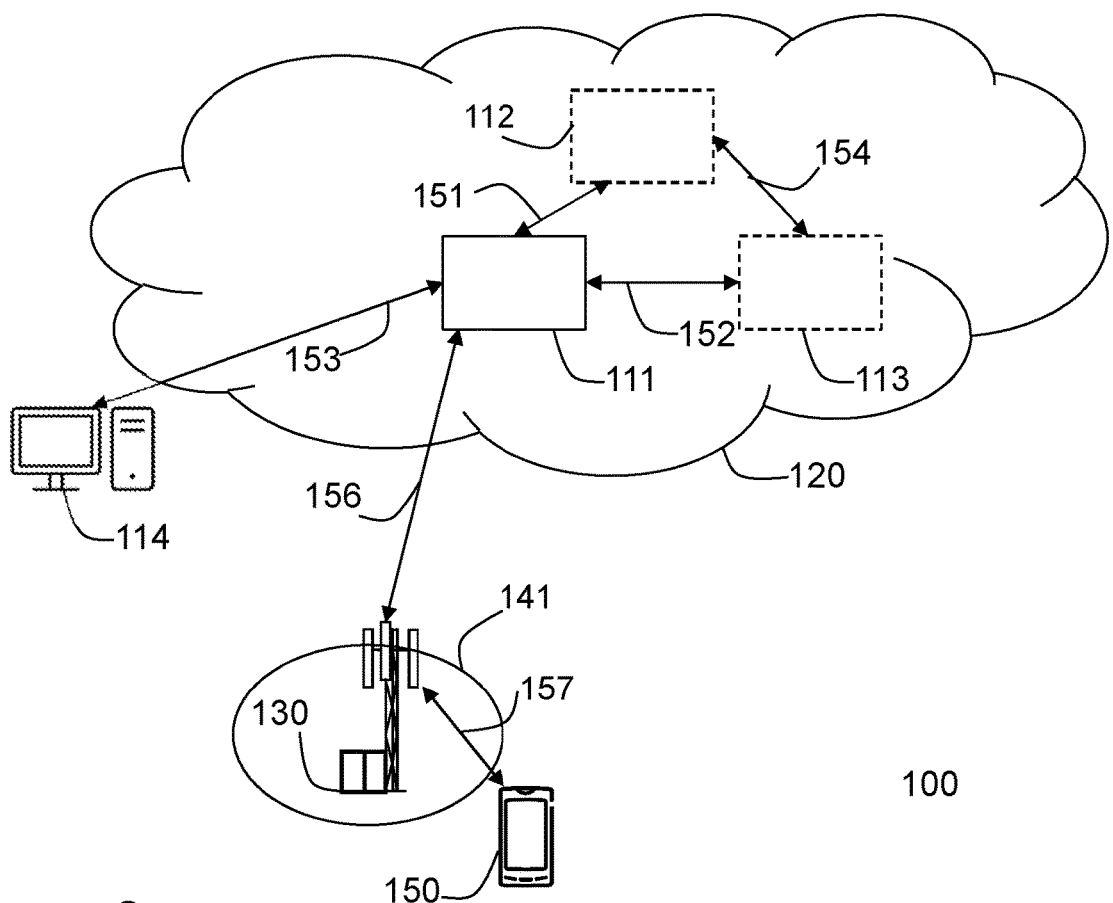

FIG. 2 depicts two non-limiting examples, in panels "a" and "b", respectively, of a communications system 100, in which embodiments herein may be implemented. In some example implementations, such as that depicted in the non-limiting example of FIG. 2a, the communications system 100 may be a computer network. In other example implementations, such as that depicted in the non-limiting example of FIG. 2b, the communications system 100 may be implemented in a telecommunications system, sometimes also referred to as a telecommunications network, cellular radio system, cellular network or wireless communications system. In some examples, the telecommunications system may comprise network nodes which may serve receiving nodes, such as wireless devices, with serving beams.

In some examples, the telecommunications system may for example be a network such as a 5G system, e.g., 5G Core Network (CN), 5G New Radio (NR), an Internet of Things (IoT) network, a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, or a newer system supporting similar functionality. The telecommunications system may also support other technologies, such as, e.g., Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system. The telecommunications system may for example support a Low Power Wide Area Network (LPWAN). LPWAN technologies may comprise Long Range physical layer protocol (LoRa), Haystack, SigFox, LTE-M, and Narrow-Band IoT (NB-IoT).

The communications system 100 comprises a first node 111, which is depicted in FIG. 2. In some embodiments, the communications system 100 may comprise a plurality of nodes, whereof, a second node 112, a third node 113 and another 114 or fourth node 114 are depicted in FIG. 2. It may be understood that the communications system 100 may comprise more nodes than those represented in FIG. 2. Any of the first node 111, the second node 112, the third node 113 and the another node 114 may be understood, respectively, as a first computer system, a second computer system, a third computer system and a fourth computer system. In some examples, any of the first node 111, the second node 112, the third node 113 and the another node 114 may be implemented as a standalone server in e.g., a host computer in the cloud 120, as depicted in the non-limiting example depicted in panel b) of FIG. 2 for the first node 111, the second node 112 and the third node 113. Any of the first node 111, the second node 112, the third node 113 and the another node 114 may, in some examples, be a distributed node or distributed server, with some of their respective functions being implemented locally, e.g., by a client manager, and some of its functions implemented in the cloud 120, by e.g., a server manager. Yet in other examples, any of the first node 111, the second node 112, the third node 113 and the another node 114, may also be implemented as processing resources in a server farm.

In some embodiments, the first node 111, the second node 112, the third node 113 and the another node 114 may be independent and separated nodes. In other embodiments, one or more of the first node 111, the second node 112, the third node 113 and the another node may co-localized or be the same node. All the possible combinations are not depicted in FIG. 2 to simplify the Figure.

The third node 113 may be understood as a node having a capability to perform AD.

The fourth node 114 may be one of a network node and a device, such as the device 150 described below. The fourth node 114 may be, for example, managed by an SME.

In some non-limiting examples, the communications system 100 may comprise one or more radio network nodes, whereof a radio network node 130 is depicted in panel b) of FIG. 2. The radio network node 130 may typically be a base station or Transmission Point (TP), or any other network unit capable to serve a wireless device or a machine type node in the communications system 100. The radio network node 130 may be e.g., a 5G gNB, a 4G eNB, or a radio network node in an alternative 5G radio access technology, e.g., fixed or WiFi. The radio network node 130 may be e.g., a Wide Area Base Station, Medium Range Base Station, Local Area Base Station and Home Base Station, based on transmission power and thereby also coverage size. The radio network node 130 may be a stationary relay node or a mobile relay node. The radio network node 130 may support one or several communication technologies, and its name may depend on the technology and terminology used. The radio network node 130 may be directly connected to one or more networks and/or one or more core networks.

The communications system 100 may cover a geographical area, which in some embodiments may be divided into cell areas, wherein each cell area may be served by a radio network node, although, one radio network node may serve one or several cells. In the example of FIG. 2, the network node 130 serves a cell 141. The network node 130 may be of different classes, such as, e.g., macro eNodeB, home eNodeB or pico base station, based on transmission power and thereby also cell size. In some examples, the network node 130 may serve receiving nodes with serving beams. The radio network node may support one or several communication technologies, and its name may depend on the technology and terminology used. Any of the radio network nodes that may be comprised in the communications system 100 may be directly connected to one or more core networks.

The communications system 100 may comprise a plurality of devices whereof a device 150 is depicted in FIG. 2. The device 150 may be also known as e.g., user equipment (UE), a wireless device, mobile terminal, wireless terminal and/or mobile station, mobile telephone, cellular telephone, laptop with wireless capability, a Customer Premises Equipment (CPE), an Internet of Things (IoT) device, or a sensor, just to mention some further examples. The device in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications system 100. The device 150 may be wireless, i.e., it may be enabled to communicate wirelessly in the communications system 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications system 100.

The first node 111 may communicate with the second node 112 over a first link 151, e.g., a radio link or a wired link. The first node 111 may communicate with the third node 113 over a second link 152, e.g., a radio link or a wired link. The first node 111 may communicate with the another node 114 over a third link 153, e.g., a radio link or a wired link. The second node 112 may communicate with the third node 113 over a fourth link 154, e.g., a radio link or a wired link. The first node 111 may communicate with the device 150 over a fifth link 155, e.g., a radio link or a wired link. The first node 111 may communicate with the radio network node 130 over a sixth link 156, e.g., a radio link or a wired link. The radio network node 130 may communicate, directly or indirectly, with the device 150 over a seventh link 157, e.g., a radio link or a wired link. Any of the first link 151, the second link 152, the third link 153, the fourth link 154, the fifth link 155, the sixth link 156 and/or the seventh link 157 may be a direct link or it may go via one or more computer systems or one or more core networks in the communications system 100, or it may go via an optional intermediate network. The intermediate network may be one of, or a combination of more than one of, a public, private or hosted network; the intermediate network, if any, may be a backbone network or the Internet, which is not shown in FIG. 2.

In general, the usage of "first", "second", "third", "fourth", "fifth", "sixth", and/or "seventh" herein may be understood to be an arbitrary way to denote different elements or entities, and may be understood to not confer a cumulative or chronological character to the nouns these adjectives modify.

Although terminology from Long Term Evolution (LTE)/5G has been used in this disclosure to exemplify the embodiments herein, this should not be seen as limiting the scope of the embodiments herein to only the aforementioned system. Other wireless systems support similar or equivalent functionality may also benefit from exploiting the ideas covered within this disclosure. In future telecommunication networks, e.g., in the sixth generation (6G), the terms used herein may need to be reinterpreted in view of possible terminology changes in future technologies.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

Embodiments of a computer-implemented method, performed by the first node 111, will now be described with reference to the flowchart depicted in FIG. 3. The method may be understood to be for handling anomalous values. The first node 111 may be operating in the communications system 100.

The method may comprise the actions described below. In some embodiments some of the actions may be performed. In some embodiments, all the actions may be performed. In FIG. 3, optional actions are indicated with dashed boxes. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 301

In the course of operations in the communications system 100, a number of metrics or variables may be registered, so that a first plurality of data indicative of some aspect of a performance of the communications system 100 may be generated, e.g., by the device 150, and other devices like it, and/or by the radio network node 130 and other radio network nodes like it, which may be operating in the communications system 100. As a non-limiting example, the values (M) may be indicative of a KPI, such as Active Uplink Users.

The ultimate aim of embodiments of the method described herein may be understood to be to enable to identify any of the obtained values that may be anomalous, and that may therefore hint that the performance of the communications system 100 may not be as expected, while filtering out any outliers that may not be considered anomalous in a particular use case. The values may be understood to be generated, registered or collected, over time, and hence to form a distribution of values over time, e.g., spanning over a number of weeks.

In order to determine the presence or not of anomalous values, the first node 111 may, in this Action 301, obtain a set of first outliers detected in the first plurality of data. The set of first outliers may be, e.g., an outlier record. Each first outlier may comprise a set of respective first values of a respective set of first variables. Whether a value may be considered an outlier or not, may be understood to be in reference to a distribution of values of a model, e.g., an ML mode. The model may be to predict one or more dependent variables based on a plurality of independent variables or features, wherein a feature may be understood as a group of independent variables considered together. The first variables may be understood to be features. That is, independent variables with respect to the one or more dependent variables to be predicted. For example, each of the first variables may be, e.g., a performance indicator such as a KPI.

Obtaining may be understood as e.g., determining, calculating, or receiving.

In some embodiments, wherein the first node 111 may be operating in the communications system 100, the set of first outliers may be obtained from the third node 113 operating in the communications system 100, e.g., via the second link 152.

The obtaining may be online, offline, continuous or periodic. Particular embodiments herein may be designed for a rolling feed of live data.

In embodiments wherein the first node 111 may have detected the set of first outliers itself, it may be understood to perform this Action 301 by running an AD algorithm. The first plurality of data, which may be also referred to herein as a training dataset, may have been pre-processed and may have its outliers labelled. Advantageously, embodiments herein may be understood to not impose any restriction on the underlying outlier detection method or seasonality residual extraction used.

By obtaining the set of first outliers in this Action 301, the first node 111 may be enabled to later generate rules mapping to the outliers detected so that the outliers may be explained, and the rules may be later appraised, thereby enabling that the outliers may be filtered and means to act upon real anomalies may be provided on a use-case basis.

Action 302

In this Action 302, the first node 111 may determine a respective set of first contexts for each first outlier comprised in the set of first outliers. One set of first contexts may correspond to one outlier.

Determining may be understood as calculating, deriving, or similar.

A context may be understood herein to refer to a set of instances, X, that may have similar circumstances. An outlier may be determined in terms of its context. In some embodiments, such as, e.g., for RAN cell KPIs, a first context may comprise at least one of: a time period when the respective first outlier was detected, a region wherein the respective first outlier was detected, a cell wherein the respective first outlier was detected and a performance indicator for which the respective first outlier was respectively detected. That is, in some embodiments, the context may be divided according to three levels: region level, cell level, and KPI level. Iterating through contexts may be understood to mean to go over all combinations of a desired level of context. The iteration may be performed once in the training phase, and periodically, e.g., once a day, in the application phase to keep the reference statistics up to date. The iteration may be also performed through every updated as performed according to Action 310. It may be understood that the time window or period may always be part of a context and may be configurable. A KPI level context may be understood to refer to a set of all values of a given KPI over a specific period. A cell-KPI level context may be understood to refer to a set of all values of a given KPI over a specific cell and period. A region-KPI context may be understood to refer to a set of all values of a given KPI over a specific region and period.

Each first context may correspond to a respective first value of a respective first variable, of the respective set of first variables. The respective first context may be comprised in one of the respective sets of first contexts.

By determining the respective set of first contexts for each first outlier comprised in the set of first outliers, the first node 111 may be enabled to analyze the occurrence of outliers in a context-sensitive manner and formulate rules with higher granularity, which may be appraised high higher accuracy, e.g., based on the circumstances of the outlier occurrence. Anomalies may therefore be filtered out of the occurring outliers with higher accuracy.

Action 303

In this Action 303, the first node 111 may then determine, for each respective set of first contexts, a respective set of first reference statistics. A reference statistic may be based on two components: context and statistical measure. A statistical measure may be understood to refer to a calculation that may be applied on the context to define a norm. An outlier may then be understood as a deviation from this norm. For example, let X be a random variable that denotes the values within a context. Statistical measures may be simple, such as mean(X), median(X), or mode(X). The measure may also be a combination of any aggregate such as a) mean(X>median(X)), the mean of all values that are greater than the median, and b) mean(X)+std(X), the sum of the mean and standard deviation of all values.

According to the foregoing, in this Action 303, the first node 111, may determine, for each respective set of first contexts, the respective set of first reference statistics using a respective set of first statistical measures.

A respective first reference statistic may be determined for each first context using a respective first statistical measure for each first value. For example, for a cell-KPI level context with n KPIs and m cells, the following may be the set of reference statistics computed:

$cell_1 kpi_1 ref, cell_1 kpi_2 ref, cell_1 kpi_3 ref, \ldots cell_1 kpi_n ref$
$cell_2 kpi_1 ref, cell_2 kpi_2 ref, cell_2 kpi_3 ref, \ldots cell_2 kpi_n ref$
$cell_3 kpi_1 ref, cell_3 kpi_2 ref, cell_3 kpi_3 ref, \ldots cell_3 kpi_n ref$
...
$cell_m kpi_1 ref, cell_m kpi_2 ref, cell_m kpi_3 ref, \ldots cell_m kpi_n ref$ The respective first reference statistic may be comprised in one of the respective sets of first reference statistics.

By determining the respective set of first reference statistics for each respective set of first contexts, the first node 111 may be enabled to analyze the occurrence of outliers and formulate context-sensitive rules adapted to the characteristics of each outlier, which may then be enabled to be appraised high higher accuracy, e.g., based on the circumstances of the outlier occurrence. Outliers may therefore be better explained, and anomalies may consequently be filtered out of the occurring outliers with higher accuracy.

Action 304

In some embodiments, wherein the set of first outliers may comprise timeseries data, the first node 111 may, in this Action 304, collate consecutive outlier instances as a single outlier record. Consecutive outlier instances may be based on a time interval between occurrences.

To collate outliers may be understood to be a process that may only apply to timeseries data wherein a set of consecutive outlier instances may be grouped together and be considered a single anomalous occurrence with the start and end times specified for reference. A sequence of outliers may be considered consecutive if they have a configurable minimal interval between them. That is, the interval between each succeeding outlier may not exceed a specified period, e.g., 30 minutes. Every outlier record may comprise a plurality of fields, each corresponding to a respective first variable. Once consecutive outliers are identified, the fields may be aggregated to condense the records of each consecutive outlier sequence to a single record.

For example, each outlier record may be represented as $[t, x_1, x_2, x_3, \ldots x_n]$, where n is the number of fields in the preprocessed data and t is the timestamp. A consecutive set of outliers, C, may be collated as a single record as:

$$b = [t_s, t_e, agg_1(\text{all } x_1 \text{ in } C), agg_2(\text{all } x_2 \text{ in } C),$$
$$agg_3(\text{all } x_3 \text{ in } C), \ldots, agg_n(\text{all } x_n \text{ in } C), \text{duration}]$$

where $t_s$ is the start time of the sequence, $t_e$ is the end time of the sequence, and $agg_i(\ )$ may be any aggregation function, such as the statistical measure in the previous section, for the $i^{th}$ field. Typical choices may be mean, maximum, and minimum. All aggregates may be kept to be the same or have different aggregations for each field. For example, monitoring KPI may have maximum aggregation and load KPI may have minimum aggregation. Duration may be understood to be a derived attribute that may either indicate the difference between $t_e$ and $t_s$, or the number of records in C, that is, the number of outliers in the sequence. The duration field may be a useful component to understand the severity of the anomaly.

By collating consecutive outlier instances as a single outlier record, the first node 111 may be enabled to ensure that there may be no multiple anomaly flags for a single consecutive set of outliers and thereby avoid that the occurrence of certain outliers may be overrepresented statistically, if in actuality their occurrence corresponds to a single event, and not multiple events. Anomalies may therefore be filtered out of the occurring outliers with higher accuracy. The collation may be understood to also enable the calculation of the duration of anomalies, and account for their severity, which may help to prioritize the anomalies.

This Action 304 may be understood to be optional. Advantageously, the method performed by the first node 111 may be applied to both timeseries and non-timeseries datasets.

Action 305

In this Action 305, the first node 111 generates a respective first rule for each first outlier in the set of first outliers detected in the first plurality of data.

Each respective first rule comprises a respective set of first conditions. Within each respective set of first conditions, each first condition compares a respective first value of a respective first variable of a respective first outlier in the set of first outliers to a corresponding respective first reference statistic for a respective first context corresponding to the respective first value of the respective first variable for the respective first outlier.

The respective first value of the respective first variable may be comprised in one of the sets of respective first values.

The generating of the respective first rule may require the pre-processed first plurality of data, or training dataset, and the indices of the outliers as input. These indices may be understood to be timestamps in the case of time series AD. In this stage, the first node 111 may compare each outlier occurrence with a reference statistic of its context to formulate rules that may be appraised by an expert.

Advantageously, the generated respective first rules may be readable and explainable.

In embodiments wherein Action 304 may have been performed, the respective first rule may be generated for each collated record.

In such embodiments, each first condition may compare each observed value of each first field of the single outlier record to the corresponding determined first reference statistic for the determined respective first context corresponding to the respective first field. In other words, a rule may show a set of conditions that may compare the observed value of each field of the collated outlier record to the corresponding reference statistic in its context. An observed value may only be considered comparatively greater or lesser than the reference value if the difference is significant.

A rule may be represented as a vector with the following format:

[condition$_1$,condition$_2$,condition$_3$, . . . condition$_n$, count,response]

where the conditions may be understood to indicate whether the observed value of the $i^{th}$ field is either greater, lesser, or approximately equal to its reference statistic. The count field may be understood to indicate how many times the outliers that pertain to all these conditions have occurred in the training data. The response field may be populated in the rule appraisal stage. It may be understood to indicate what may have to be done as a response to the occurrence of this rule. The response field may include multiple nested fields as required to store relevant information such as severity, priority, type, etc. in addition to the sequence of actions to be performed.

A condition may also be applied on the duration field for time series data as well with a user-defined constant as a reference statistic. For example, duration >4, may be understood to mean if the anomaly has occurred consecutively greater than 4 times.

As an example of the respective first rule that may be generated in this Action 305, given an outlier record, let $x_1$, $x_2$, and $x_3$ be the observed first values of fields $X_1$, $X_2$, and $X_3$ respectively. If the statistical measure for comparison is the median, then a sample respective first rule may be:

1. $x_1 <$ median($X_1$)
2. $x_2 >$ median($X_2$)
3. $x_3 \approx$ median($X_3$)

where the median may be calculated from the subset of data that is not labelled outlier by the outlier detector.

In this non-limiting example, the statistical measure may be understood to be the median, and the context may be understood to be only the fields, that is, the first variables $X_1$, $X_2$, and $X_3$. In this non-limiting example, median(X) i may be understood to be the reference statistic that may be computed for each context.

The rules may be combined or split based on the use case. An example of a combined rule in the above case may be to consider all occurrences where the first two conditions of $x_1$ and $x_2$ apply, regardless of the value of $x_3$. Splitting a rule may be understood to mean to consider a single generated rule as two or more separate occurrences pertaining to a set of conditions. For instance, in the above case, conditions 1 and 3 may be one rule and conditions 2 and 3 may form another rule.

By generating the respective first rule for each first outlier in this Action 305, the first node 111 may map the groups of instances, labelled as outliers by the anomaly detector, according to their statistical characteristics with reference to the ones that are not anomalous, to unique rules that may be readily understood by a human expert. The expert may then be enabled to provide feedback to the first node 111 for each rule to confirm which of these rules may provide value to the use case. The feedback may include accepting the rule to be anomalous and assign an appropriate response to their occurrence, or whitelisting a rule as not anomalous, so that any outliers matching the whitelisted rule may be filtered out as non-anomalies.

By mapping anomalies to rules, the first node 111 may then be enabled to associate anomalies with the necessary steps to take as a response to its occurrence. Each rule may be associated to a sequence of actions that may need to be taken, e.g., by the second node 112, if an anomaly matching the rule occurs. This may be understood to not mean to discard the outlier detector altogether once the rules may have been identified, since it may also be possible to discover new anomalies in production that may not yet have occurred in the training data.

Action 306

In this Action 306, the first node 111 determines, for each generated respective first rule, whether or not the generated respective first rule matches a previously unappraised rule. This enable the first node 111 to identify new rules, and prepare them for appraisal, or to keep count of the occurrence of the generated rules, so that rules that may occur too frequently may be whitelisted.

Action 307

In this Action 307, the first node 111 initiates performing one of the following. With the proviso that the generated respective first rule is determined to match a previously unappraised rule, the first node 111 adds one count of occurrence of the matched previously unappraised rule. By keeping count of the occurrence of the matched previously unappraised rules, the first node 111 may then be enabled to determine, e.g., itself, if the occurrence of a rule is high, and may therefore be likely whitelisted for being too common to be considered to describe an "anomaly".

The first node 111 otherwise provides, with the proviso that the generated respective first rule is determined to lack a match to a previously unappraised rule and to any previously appraised rule, a first indication. The first indication indicates the generated respective first rule is unappraised. The first node 111 may therefore be understood to handle unknown rules, should they occur.

Initiating may be understood as starting itself, or triggering, facilitating or enabling another node to perform the options above.

Providing may be understood as e.g., outputting itself or sending or transmitting.

In some embodiments wherein the first indication may be provided to the another node 114.

The first node 111 may account for the rules that may have been discovered and appraised. When an outlier that does not correspond to an existing rule set may have been discovered by the first node 111, which may be understood to be a rule miner system, the first node 111 may, after creating the rule in Action 305, add it to the list of rules that have not yet been appraised by an expert. The default action on rules that have not been appraised may be to raise an alarm as an example of the first indication, as if a critical anomaly is detected due to the unknown nature of the new occurrence.

In some embodiments, each of the previously appraised rules may have a priority level assigned. This may enable to map rules to severity, so that anomalies may be prioritized accordingly A possible way of how the rule formulation may be achieved is depicted with the algorithm shown below:

---

1. Start by initiating an empty unappraised rule set;
2. For each collated outlier record;
   2.1. Initiate empty rule vector;
   2.2. For each field $x_i$ in the record;
      2.2.1. Let ref be the corresponding reference statistic in the outlier's context;
      2.2.2. If $x_i \gg$ ref, then, append to rule vector the value 1 to indicate that $x_i >$ ref
      2.2.3. If $x_i \ll$ ref, then, append to rule vector the value −1 to indicate that $x_i <$ ref
      2.2.4. Otherwise, append to rule vector the value 0 to indicate that $x_i \approx$ ref
   2.3. If the rule vector already exists in the unappraised rule set, then increment the count by one;
   2.4. Otherwise, add the rule vector to the unappraised rule set;
3. End by returning the unappraised rule set.

---

The checks in step 2.2.2 and 2.2.3, that is whether $x_i \ll$ ref, or $x_i \gg$ ref, may be done based on a heuristic that may be suitable for the data. For example, if the concerned field varies on a linear scale, then a simple difference threshold may be used, as in the following example:

$$x_i - ref > \theta \Rightarrow x_i \gg ref \text{ and } x_i - ref < -\theta \Rightarrow x_i \ll ref$$

If the field varies at an exponential scale, then a ratio-based threshold may be used, as in the following example:

$$\frac{x_i}{ref} > \theta \Rightarrow x_i \gg ref \text{ and } \frac{ref}{x_i} > \theta \Rightarrow x_i \ll ref$$

The condition check may be computed as a combination of difference and ratio-based methods. The first node 111 may perform the check to show how the observed outlier record may compare to the reference statistic.

Step 2.3 shows how similar outliers may be into the same rule. This step may identify that the current outlier occurrence may match an existing rule and may increment its count.

Therefore, all rules in the resulting unappraised rule set may be understood to be unique with a count for each rule.

By the first node 111 providing the first indication, the first node 111 may enable appraisal of each rule an on use-case basis, e.g., by an SME expert, who may then provide feedback to the first node 111. The feedback may include accepting the rule to be anomalous and assigning an appropriate response or whitelisting a rule as not anomalous. The first node 111 may also mention, in the first indication, the number of anomalous occurrences of each group within the training set.

Action 308

In some embodiments wherein the set of first outliers may comprise timeseries data, the first node 111 may, in this Action 308, determine whether or not the count of occurrence of the matched previously unappraised rule may be above a threshold. The first node 111 may then whitelist the matched previously unappraised rule with the proviso the count may be determined to exceed the threshold.

By definition, a condition that occurs quite often, that is, with high count, may need not be considered an anomaly at all. Such rules may optionally be whitelisted as not anomalous. Thus, the threshold may be set as a critical frequency, f_c, and all rules with a count above this frequency may be chosen to be whitelisted. The remaining rules may then be associated with a default alarm. Although this may not be the most effective way to handle anomalies, e.g., for assigning appropriate responses cannot be and to avoid introducing false positives, this process may increase efficiency through automation if an SME is not available.

By whitelisting the matched previously unappraised rule with the proviso the count may be determined to exceed the threshold, the first node 111 may be enabled to filter out generated rules that may occur too often to be considered anomalies, thereby reducing the appraisal load, and simplifying and expediting the appraisal process. Advantageously, even in the absence of domain knowledge, by applying the principle behind the definition of an anomaly, if an anomaly pertaining to a certain rule is occurring too frequently, then such occurrences are probably not anomalous at all and hence may be whitelisted.

Action 309

In some embodiments wherein the first indication may be provided to the another node 114, the first node 111 may, in this Action 309, obtain, based on the provided first indication, a second indication from the another node 114. The second indication may indicate the generated respective first rule is one of: a) appraised and assigned to an action, b) whitelisted, c) combined and d) split. The another node 114 may be managed by the SME and may provide the output of the appraisal.

Obtaining may be understood as e.g., receiving.

The unappraised ruleset may be assessed one-by-one by SME who may then define appropriate responses for the anomalous occurrence. For each rule, the SME may take one of four actions: assign a response, whitelist, combine or split. Advantageously, the first node 111 may not only provide a way to explain anomalies, but also the means to act upon them.

All rules that may have been appraised may be appended to the appraised rule set.

An appraised rule may be represented as:

[[sequence of conditions],response]

According to the option of assigning a response to the rule, the response may be an action or a sequence of actions to be followed with the proviso that an anomaly matching this rule were to occur. The action may be simple, such as alerting with an alarm, creating an automated ticket, or even taking remedial actions as part of close loop automations to counteract the anomaly. For example, in a thermal power plant, an anomalous increase in pressure and temperature may be acted upon by reducing the fuel feed and initiating the cooling process.

It may be noted that the count variable is only optional at this stage since its existence may be understood to be to merely to support the SME to assign an appropriate response. The SME may also add custom conditions to extend the rule, e.g., $x\_1 > 2x\_3$, duration $>5$ intervals, etc.

According to the second option of whitelisting a rule, there may be rules that may look like significant outliers to the AD algorithm, but their occurrence may not impact the use case. Hence, such rules that are not of importance in a particular use case, may be whitelisted as false positives and no action may need to be taken for their occurrence. The simplest way to whitelist a rule may be to associate its condition sequence with a null response.

According to the third option of combining rules, if a rule is similar to another previously observed and appraised rule and may be associated with the same response, then this rule may be combined with the corresponding appraised rule.

For example, the rules with conditions $[a, b, c, d_1, \ldots]$ and $[a, b, c, d_2, \ldots]$ may be combined as $[a, b, c, x, \ldots]$ with a common response, where $d_1$ and $d_2$ may indicate two different conditions but do not affect the overall definition of the rule according to the SME.

According to the four option of splitting the rule, if the rule may be considered a composition of two or more rules to which individual actions may be assigned, it may be split accordingly. The rules that may be split may be added back to the unappraised rule set to be assessed separately.

For example, if a rule is represented as a numerical vector as shown in Action 305, some of the possible ways a condition sequence of a rule [a, b, c, d, e, f, g] may be split may be

[a, b, c, d, x, x, x] and [x, x, x, x, e, f, g]

[a, b, x, x, e, f, g] and [a, b, c, d, x, x, x]

[a, x, c, x, e, x, g] and [x, b, x, d, x, f, x]

assuming letters 'a' through 'g' refer to conditions and 'x' stands for a "don't-care" condition, similar in definition to a "don't-care" condition digital systems. Simply put, 'x' may assume any condition. For example, the rule [a, b, c, d, x, x, x] may be considered satisfied if just conditions a, b, c, and d, are true, regardless of the other values specified by 'x'.

It may be noted that once the rules are split with "don't care" conditions, their occurrence count may increase due to other matching rules and therefore, their count variable may be recomputed accordingly.

Action 310

In this Action 310, the first node 111 may update the respective first statistical measure. The updating of the statistical measures according to this Action 310 may be performed periodically.

The first node 111 may be equipped to handle concept drifts, e.g., by incorporating the method prescribed in reference [13].

By updating the respective first statistical measure in this Action 310, the first node 111 may be enabled to counteract possible concept drift. In the context of embodiments herein, a concept drift may be understood to be a significant change in the behavior of the environment of the system collecting the data, which may cause an increase/decrease in typical values of the variables monitored by the system. For example, when a new office building is opened, the load KPIs of the cell towers in the vicinity may all exhibit an overall peak in their normal working conditions. Such behavior may be accounted by the system by keeping the statistics of the context up to date. The periodicity of the training and the time window of the context may depend on the problem. In general practice, the system may keep the context of a 30-day time window and update with a daily periodicity. Advantageously, even when concept drift occurs, the rules may still hold since they may be understood to advantageously not be based on static thresholds. A reference statistic may be understood to be persisted for each active context of the multiple contexts in the system and may be understood to be kept up-to-date to counteract concept-drifts. The rules generated according to embodiments herein may be understood to advantageously be generalizable in the sense that they may be understood to hold true to future circumstances of unseen data and multiple contexts, and true even in the event of a concept drift.

Action 311

In some embodiments wherein the first indication may be provided to the another node 114, the first node 111 may, in this Action 311, iterate, during a training phase, the preceding actions 301, 302, 303, 304, 305, 306, 307, and 309 to obtain a plurality of further appraised rules and respective assigned actions, to append to a set of previously appraised rules.

Iterating may be understood as e.g., repeating or looping.

In some embodiments, the iterating of this Action 311 may further comprise iterating the determining in Action 308 of whether or not the count of occurrence of the matched previously unappraised rule may be above the threshold.

The iterating of Action 311 may further comprise iterating the updating 310.

The training phase may be understood to refer to a phase wherein a set of appraised rules may be built. The training phase may, for example, start with the rule generation stage which may take in the output of the outlier detection algorithm, after thresholding, if any, to formulate rules. These rules may be passed on to a rule appraisal stage where they may be assessed by a Subject Matter Expert (SME) to confirm which of these rules may provide value to the use case, and possibly include corresponding responses to their occurrence.

Once the first node 111 may have gathered a set of appraised rules it may consider adequate, e.g., by iterating Action 309, it may then pass to a rule matching or application phase which may comprise Actions 312-318, wherein the appraised rules gathered during the training phase may be applied to new coming outliers. Alternatively, or additionally, the first node 111 may send the gathered a set of appraised rules to e.g., the second node 112, to enable the second node 112 to run the rule matching or application phase with the outliers it may collect. The sending of the gathered set of appraised rules may be performed, for example, after the iterating of this Action 311 may be completed.

Action 312

In this Action 312, the first node 111 may obtain, after conclusion of the training phase, a second outlier detected in a second plurality of data, wherein the second outlier may comprise a set of second values of a set of second variables.

The set of second variables may be the same as the set of first variables.

This Action 312 may be understood to correspond to the application phase.

Obtaining may be understood as e.g., receiving or detecting itself.

In some embodiments wherein the first node 111 may be operating in the communications system 100, any of the set of first outliers and the second outlier may be obtained from the third node 113 operating in the communications system 100.

Once the second outlier may be detected in production, the first node 111 may be enabled to, in the rule matching stage, apply any of the rules it may have generated during the training phase. That is, search for the associated rule for the occurrence. Once a match may be found, the corresponding action may be taken based on the response mapping in the rule or the first node 111 may be enabled to filter out the detected second outlier as not an anomaly, in a simplified, expedited, process. If there is an anomalous occurrence that does not match the appraised rule set, then the first node 111 may be enabled to create a corresponding rule to be appraised by the SME again in the rule appraisal stage.

Action 313

In this Action 313, the first node 111 may determine a set of second contexts of the second outlier, wherein each second context corresponds to a respective second value of a respective second variable.

That is, the first node 111 may repeat the same steps performed during the training phase, for the second outlier. This also applies to the next Actions 314-316. The difference may be understood to be that the rule generation stage may work on the first plurality of data, that is, the training dataset to produce a rule set, whereas the rule matching stage may work on the current context to evaluate live anomalies.

Action 314

In this Action 314, the first node 111 may determine, for the set of second contexts, a set of second reference statistics using a set of second statistical measures. A respective second reference statistic may be determined for each second context using a respective second statistical measure for each second value.

The set of second reference statistics may be the same as the a set of first reference statistics.

The determining in Action 314 of the second reference statistic may be based on the updated respective first statistical measure.

Action 315

In some embodiments wherein the second outlier may comprise timeseries data, in this Action 315, the first node 111 may collate consecutive outlier instances as a single record. Consecutive outlier instances may be based on the time interval between occurrences.

Each second condition may compare each observed value of each second field of the single record to the corresponding determined second reference statistic for the determined respective second context corresponding to the respective second field.

That is, the second outlier may also be a collated outlier in the case of timeseries data. Each time an outlier may occur within the minimum interval, it may be collated with the most recent outlier by increasing the duration by one and updating its fields according to the steps mentioned for Action 304. The first node 111 may be configured to do one of two options. According to a first option, Option 1, the first node 111 may repeat the collate outliers process until no more outliers may be collated, for example, the minimum interval may have elapsed. Then, a single collated outlier may be provided, e.g., sent, to the formulate rule process. This option may ensure that there may be no multiple anomaly flags for a single consecutive set of outliers. However, the anomaly may only be notified by the system once the entire duration of the anomalous occurrence may have elapsed.

According to a second option, Option 2, for every outlier, the first node 111 may collate with the most recent outlier, if within minimum interval, and then send it to the formulate rule process. This may create multiple anomaly flags for each consecutive outlier. However, this option may be more useful when it may be desirable to be notified of the anomaly before it may become too severe or when the anomaly may be prolonged.

Action 316

In this Action 316, the first node 111 may generate a second rule for the second outlier. The second rule may comprise a second set of conditions. Each second condition may compare a second value of a second variable of the obtained second outlier to the determined second reference statistic for a respective second context corresponding to the second value of the second variable of the second outlier.

This compute rule Action 316 may reuse many of the components in the rule generation stage. The difference may be understood to be that the rule generation stage may work on the first plurality of data, that is, the training dataset to produce a rule set, whereas the rule matching stage may work on the current context to evaluate live anomalies.

In some embodiments, any of the respective first rules and the second rule may be readable and explainable.

The first node 111 may generate, in this Action 316, the second set of conditions as a set of conditions that may reflect the observed second outlier. For this Action 316, the first node 111 may require to persist the current context and compare it to the configured statistical measure described in Action 302. It may be noted that the current context may be recomputed periodically to deal with concept drifts.

In some embodiments wherein Action 305 may have been performed, the second rule may be generated for a collated record.

Action 317

In the rule matching stage, once the first node 111 may be deployed, it may actively check the condition of every outlier detected, such as the second outlier, to see if it may match a rule in the set of appraised rules which may have been collected during the training phase of Actions 301-311.

Initiating may be understood as starting itself, or triggering, facilitating or enabling another node to perform the options above.

In this Action 317, the first node 111 may determine whether or not the generated second rule may match any of the previously appraised rules and respective assigned actions.

The formulated rule pertaining to the observed second outlier may be compared to the rules of the appraised rule set. If a matching rule is found, the first node 111 may follow the response associated with the rule. If not, the first node 111 may create a new rule corresponding to the unseen occurrence and append it to the unappraised rule set to be appraised by an SME. Since every outlier may be understood to need to be mapped to a response, the first node 111 may be configured with a default action that it may need to take if it experiences an outlier that does not match the rules of the appraised rule set. After the action, the first node 111 may use the conditions created by Action 316 to formulate a rule following the steps in Action 305 and may add it to the unappraised rule set. If there is already a matching rule in the unappraised rule set, then the first node 111, instead of appending the rule, may increase the count of the existing rule by one.

In the application phase, an SME may be expected to periodically follow the rule appraisal stage should there be unappraised rules observed by the first node 111 in the rule matching stage.

Action 318

In this Action 318, the first node 111 may initiate performing one of the following. With the proviso that the generated second rule may match at least one of the previously appraised rules, the respective assigned action. That is, once a matching rule may be found, the action as mentioned in the response field of the matching rule may be followed by the first node 111 or by yet another node in the communications system 100, e.g., the second node 112. With the proviso that the generated second rule may lack a match to any of the previously appraised rules and to any previously unappraised rule, providing a third indication. The third indication may indicate the generated third rule is unappraised. The third indication may be provided, e.g., sent to, for example, the another node 114, and or/to the second node 112.

In some embodiments, wherein each of the previously appraised rules may have the priority level assigned, the initiating in this Action 318 of the performance of the respective assigned action may be further based on the respective priority level assigned to the previously appraised rule matching the second rule.

In some embodiments, any of the Actions 301-318 performed by the first node 111 may be performed online.

In particular embodiments, the obtaining 312 of the second outlier, the determining 313 of the set of second contexts of the second outlier, the determining 314 of the set of second reference statistics, the generating 316 of the second rule, the determining 317 of whether or not the generated second rule matches any of the previously appraised rules and respective assigned actions, and the initiating of the performing 318 of the assigned action or providing the third indication, may be performed online.

By initiating performing the assigned action if the generated second rule matches at least one of the previously appraised rules, the first node 111 may enable to handle, online, the occurrence of the filtered anomalies and therefore remedy what may be causing the anomaly. The performance of the communications system 100 may therefore be improved or prevented from being poor.

By initiating providing the third indication if the generated second rule lacks a match to any of the previously appraised rules and to any previously unappraised rule, the first node 111 may enable to discover the occurrence of new anomalies, online. The performance of the communications system 100 may therefore be constantly improved or prevented from becoming poor.

Embodiments of a computer-implemented method, performed by the second node 112, will now be described with reference to the flowchart depicted in FIG. 4. The method may be understood to be for handling anomalous values. The second node 112 may be operating in the communications system 100.

The method may comprise the following actions. Several embodiments are comprised herein. In some embodiments, the method may comprise all actions. In other embodiments, the method may comprise some of the actions. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are depicted with dashed lines.

Figure 4:
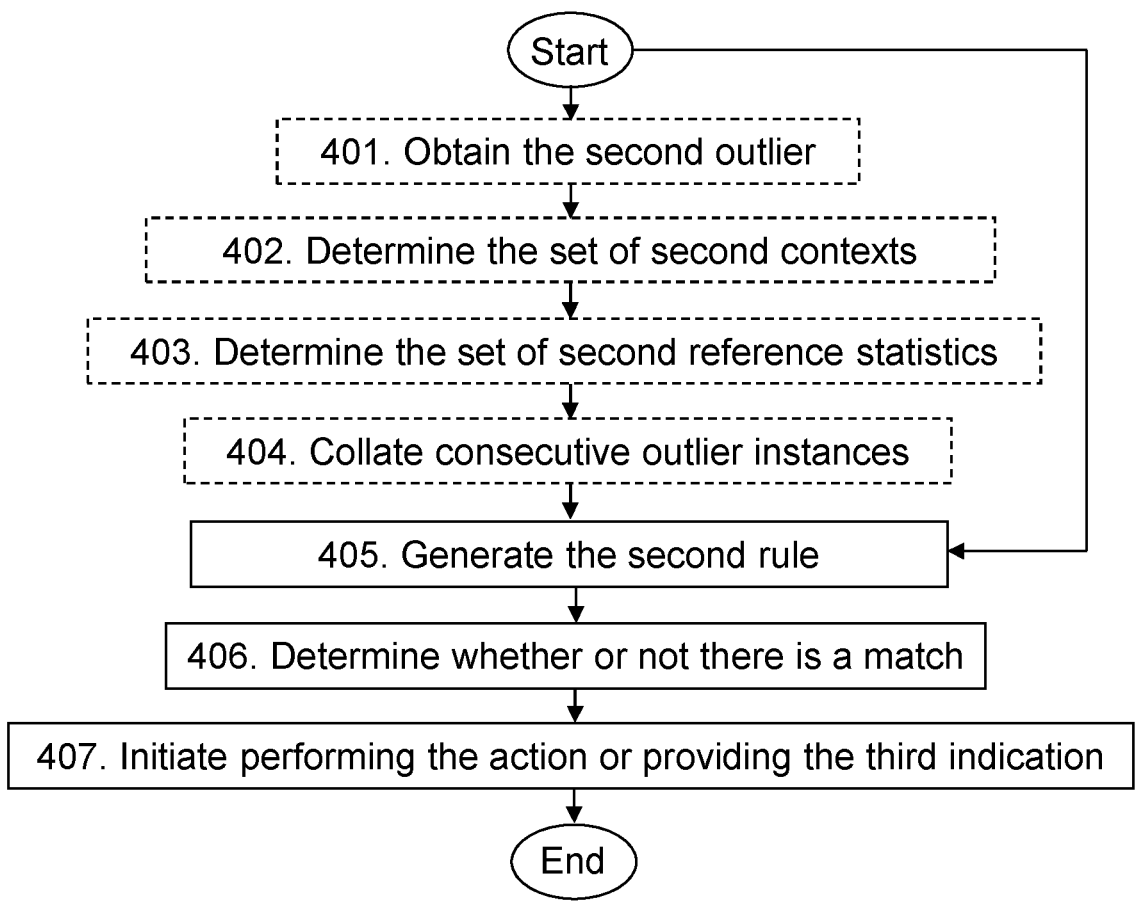
FIG. 4 is a flowchart depicting a method in a second node, according to embodiments herein.

A non-limiting example of the method performed by the second node 112 is depicted in FIG. 4. In FIG. 4, optional actions in some embodiments may be represented with dashed lines. The detailed description of some of the following corresponds to the same references provided above, in relation to the actions described for the first node 111 and will thus not be repeated here to simplify the description. For example, a context may be understood herein to refer to a set of instances, X, that may have similar circumstances. An outlier may be determined in terms of its context.

Action 401

In some embodiments, the rule matching or application phase described for the first node 111, that is Actions 312-318 may be performed by a different node, such as the second node 112, which may perform corresponding actions to those already described for the first node 111. The second node 112 may have obtained the set of appraised rules from the first node 111 collected during the training phase.

In this Action 401, the second node 112 may obtain the second outlier, that is a new outlier, e.g., online. The second outlier may comprise the set of second values of the set of second variables. The second value of the second variable may be comprised in the set of second values. Obtaining may be understood as e.g., collecting, recording, retrieving, gathering, and/or receiving. The obtaining may be online, offline, continuous or periodic. Particular embodiments herein may be designed for a rolling feed of live data.

In some embodiments wherein the first node 111 may be operating in the communications system 100, the second outlier may be obtained from the third node 113 operating in the communications system 100, e.g., via the fourth link 154.

Action 402

In this Action 402, the second node 112 determines the set of second contexts of the second outlier. Each second context may correspond to the respective second value of the respective second variable. Each second context may correspond to the respective second value of the respective second variable. The respective second context may be comprised in the set of second contexts.

Determining may be understood as calculating, deriving, or similar.

The second context may comprise at least one of: the time period when the second outlier was detected, the region wherein the second outlier was detected, the cell wherein second outlier was detected and the performance indicator for which the second outlier that was respectively detected.

Action 403

In this Action 403, the second node 112, may then determine, for the set of second contexts, the set of second reference statistics using the set of second statistical measures. The respective second reference statistic may be determined for each second context using the respective second statistical measure for each second value. The respective second reference statistic may be comprised in the set of second reference statistics.

Action 404

In some embodiments wherein the second outlier may comprise timeseries data, the second node 112 may, in this Action 404, collate consecutive outlier instances as a single record. Consecutive outlier instances may be based on the time interval between occurrences.

Action 405

In this Action 405, the second node 112 may generate the second rule for the second outlier detected in the second plurality of data. The second rule comprises the second set of conditions. Each second condition compares the second value of the second variable of the second outlier to the determined second reference statistic for the respective second context corresponding to the second value of the second variable of the second outlier.

In some embodiments, the second rule may be readable and explainable.

In embodiments wherein Action 404 may have been performed, the second rule may be generated for the collated record. Each second condition may compare each observed value of each second field of the single record to the corresponding determined second reference statistic for the determined respective second context corresponding to the respective second field.

Action 406

In this Action 406, the second node 112 determines whether or not the generated second rule matches any previously appraised rule and respective assigned actions obtained from the first node 111.

Action 407

In this Action 407, the second node 112 initiates performing one of the following. According to a first option, with the proviso that the generated second rule matches at least one of the previously appraised rules, the respective assigned action. According to a second option, with the proviso that the generated second rule lacks a match to any of the previously appraised rules and to any previously unappraised rule, providing the third indication. The third indication indicates the generated third rule is unappraised.

Providing may be understood as e.g., outputting itself or sending or transmitting, e.g., to the another node 114.

In some embodiments, any of the Actions 401-407 performed by the second node 112 may be performed online.

In particular embodiments, the obtaining 401 of the second outlier, the determining 402 of the set of second contexts of the second outlier, the determining 403 of the set of second reference statistics, the generating 405 of the second rule, the determining 406 of whether or not the generated second rule matches any of the previously appraised rules and respective assigned actions, and the initiating of the performing 407 of the assigned action or providing the third indication, may be performed online.

Figure 5:
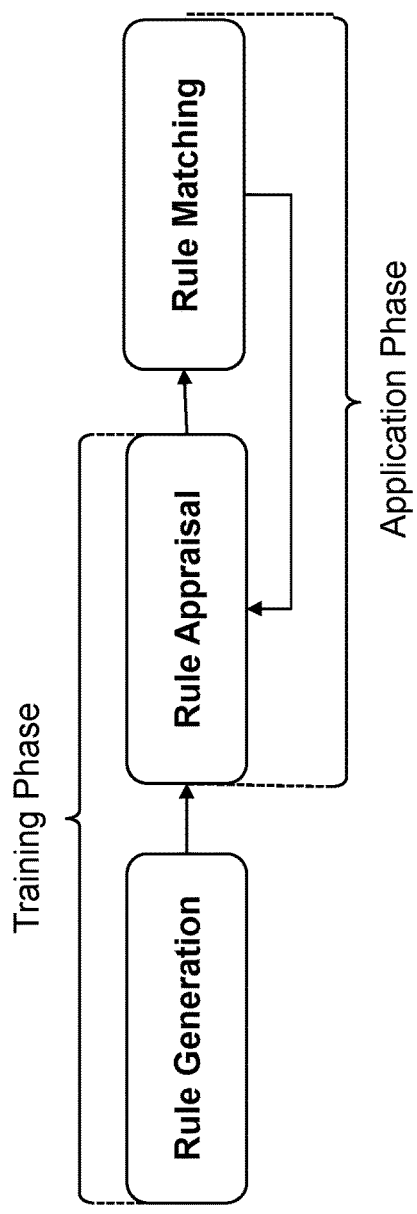
FIG. 5 is a schematic diagram illustrating a non-limiting example of an aspect of the method performed by the first node, according to embodiments herein.

FIG. 5 is a schematic diagram illustrating the phases and components of the anomaly rule miner of the communications system 100, according to embodiment here. The three components, generation, appraisal and matching may be considered to be split into two phases, training and application. The appraisal may be understood as a common component for both phases as during rule matching, it may be possible to discover new rules which may also require an appraisal from an expert. Embodiments herein may be understood to connect the above stages into training and application phases as shown in FIG. 5, as explained in detail above, and as further illustrated in the examples of FIGS. 6-8. The following subsections explains these phases and the composing stages. Embodiments herein may comprise three stages: 1) a rule generation stage, schematically depicted in FIG. 6, which may comprise Actions 301-311, 2) a rule appraisal stage, schematically depicted in FIG. 7, and 3) a rule matching stage, schematically depicted in FIG. 8, which may comprise Actions 312-318 or Actions 401-407. The rule generation phase may be performed by the first node 111. The rule matching phase may be performed by the first node 111 and/or by the second node 112. The appraisal stage may be performed via the fourth node 114, and partly by the first node 111.

Figure 6:
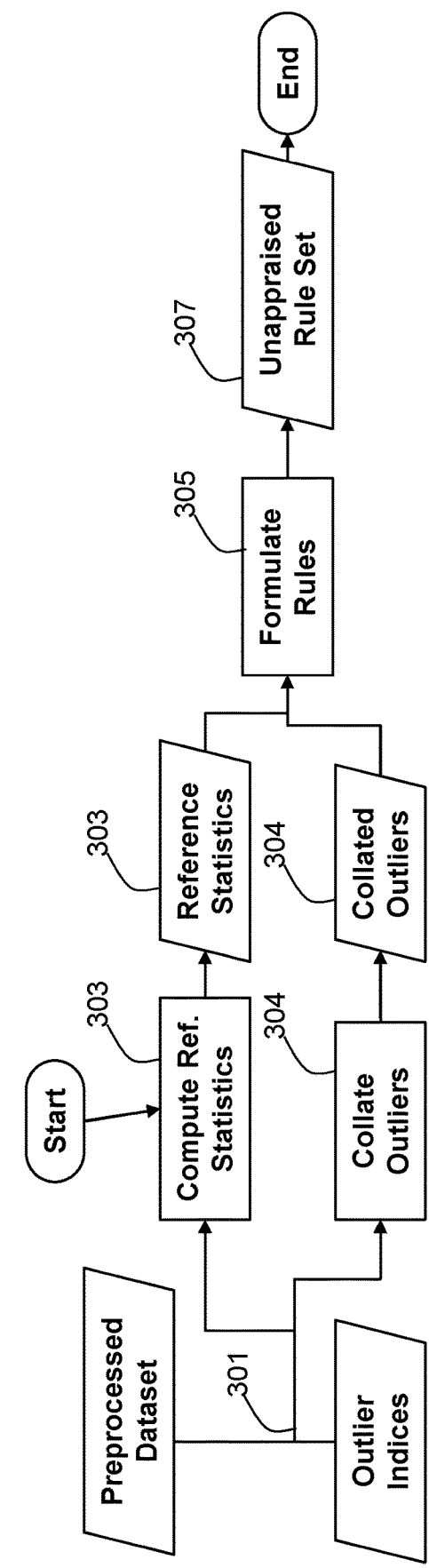
FIG. 6 is a schematic diagram illustrating another non-limiting example of some aspects of the method performed by the first node, according to embodiments herein.

FIG. 6 is a flowchart illustrating a non-limiting example of the rule generation flow according to embodiments herein. As depicted in the chart, rules may be generated using both the preprocessed dataset, that is the preprocessed first plurality of data, and outlier indices produced by the AD model, e.g., as run by the third node 113, and obtained according to Action 301. The first node 111 may then compute the respective set of first reference statistics according to Action 303 and collate the consecutive outlier instances according to Action 304. The first node 111 may then formulate the respective first rules, according to Action 305. The output of this process may be the first indication provided according to Action 307, comprising a set of rules that may have to be appraised by an expert. In addition to the rules themselves, the output may also include the frequency of occurrence for each rule.

Figure 7:
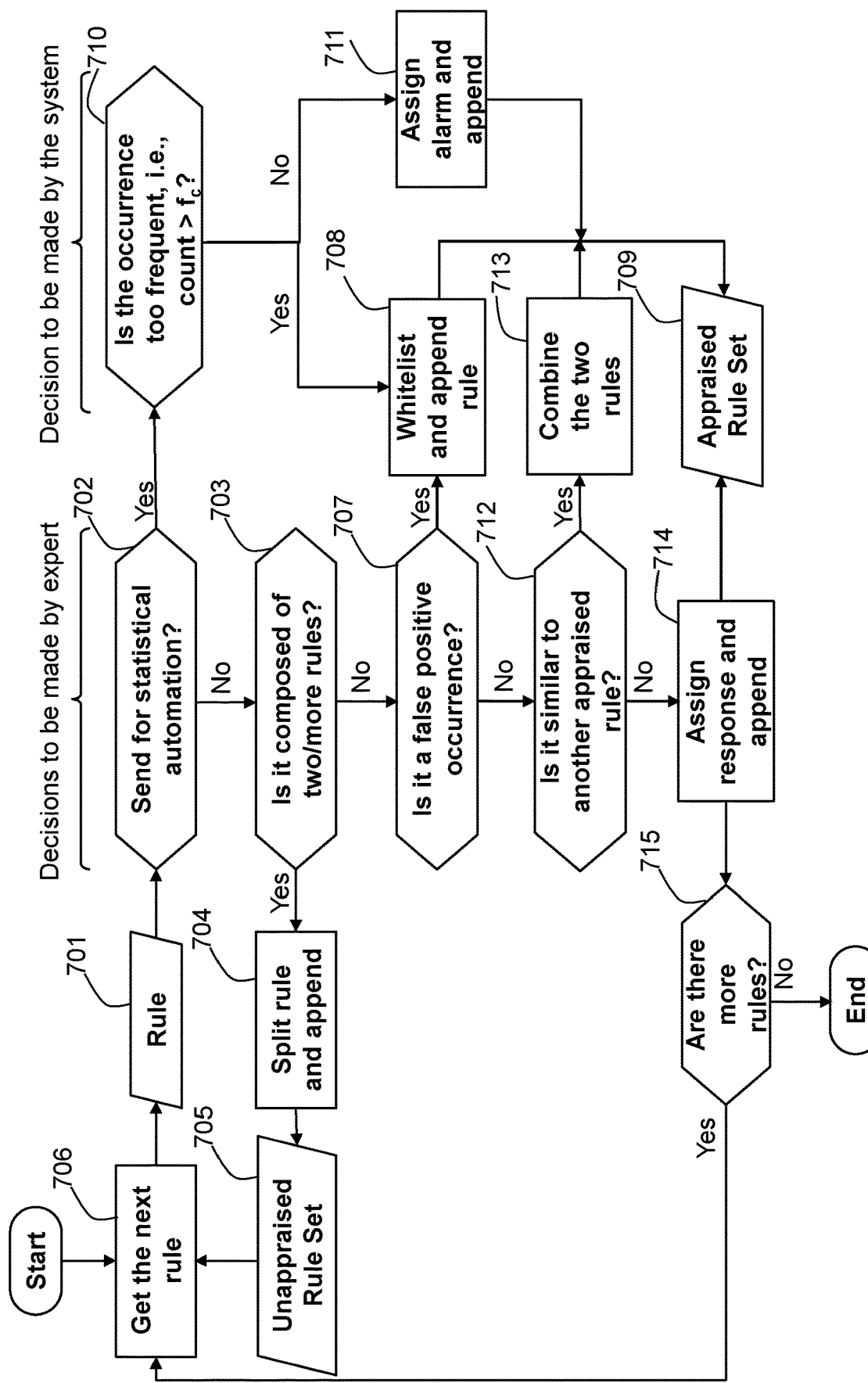
FIG. 7 is a schematic diagram illustrating another non-limiting example of the method performed by the first node, according to embodiments herein.

FIG. 7 is another flowchart illustrating a non-limiting example of the rule appraisal flow according to embodiments herein. As depicted in the chart, once the rules are generated, they may be appraised by a domain expert. During the rule appraisal stage, the unappraised ruleset may be assessed one-by-one by an SME, who may then define appropriate responses for the anomalous occurrence. A rule, e.g., the first rule, may be obtained by the expert at 701, who may decide if the rule is to be sent for statistical automation at 702. If the rule is not sent for statistical automation, the expert may decide if the rule is composed of two or more rules at 703. If it is, the rule may be split into multiple rules at 704 and appended to the unappraised rule set at 705, for which the process may be eventually reinitiated at 706. If the rule is not composed of two or more rules, the expert may also evaluate if the rule is a false positive occurrence at 707. If so, the expert may whitelist the rule as a false positive at 708 and append it to the appraised rule set at 709. The rule may also be whitelisted if its count in the dataset is beyond the critical frequency, $f\_c$, for statistical automation at 710, in accordance with Action 308. Otherwise, the rule may be assigned an alarm and appended to the appraised rule set at 711. If the rule is not a false positive occurrence, the expert may decide if the rule is similar to another appraised rule at 712. If so, the rule may be combined with an existing appraised rule at 713. If the rule is not similar to another appraised rule, the expert may assign an appropriate response to be taken on its occurrence at 714 and add it to the appraised rule set at 709. Otherwise, the expert may check if there are more rules at 715. If so, the method may iterate back to step 706. Otherwise, the appraisal phase may end.

Figure 8:
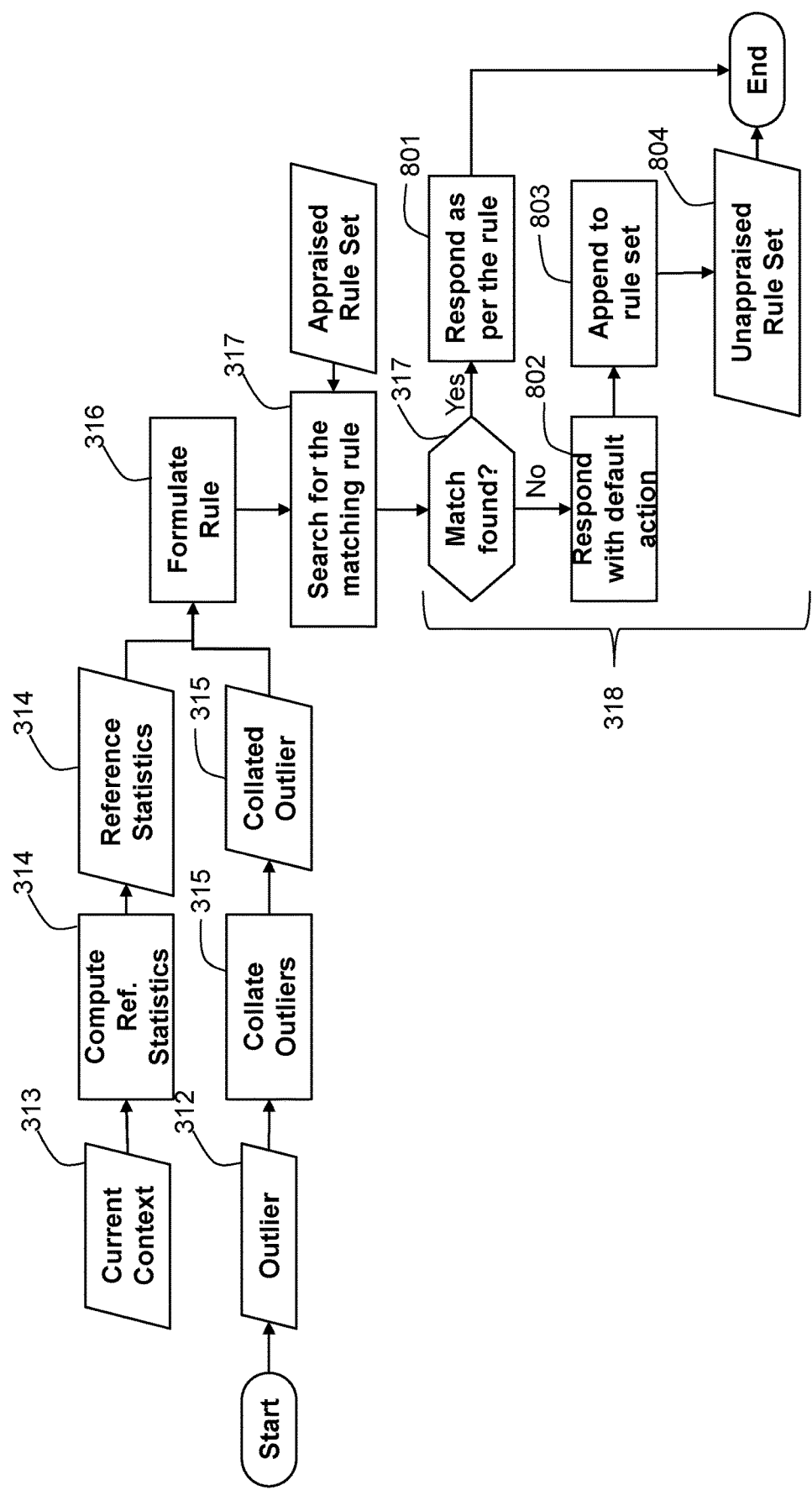
FIG. 8 is a schematic diagram illustrating another non-limiting example of some aspects of the method performed by the first node, according to embodiments herein.

FIG. 8 is another flowchart illustrating a non-limiting example of the rule matching and discovery flow according to embodiments herein. In the rule matching stage, once the first node may be deployed, it may actively check the condition of every outlier detected, such as the second outlier, to see if it may match a rule in the set of appraised rules as shown in FIG. 8. As depicted in the chart, in production, each outlier may be tested against the rule set. The second outlier may be obtained in accordance with Action 312. Consecutive outlier instances may be collated according to Action 315. The set of second contexts of the second outlier may be determined according to Action 313 and the set of second reference statistics may be determined according to Action 314. A second rule may then be formulated according to Action 316, and the first node 111 may determine whether or not the generated second rule matches any of the previously appraised rules and respective assigned actions, obtained by iterations of Action 309, according to Action 317. Once a matching rule may be found, appropriate action may be taken at 801 according to Action 318 based on the response set during appraisal. However, if a matching rule is not found, a default action may be taken at 802 according to Action 318, and then a new rule may be created corresponding to the anomalous occurrence and appended to the unappraised rule set at 803, which may then be provided in the third indication at 804.

One advantage of embodiments herein may be understood to be that the first node may not only provide a way to explain anomalies but also the means to act upon them.

Another advantage of embodiments herein may be understood to be that the rule miner may be applied to both timeseries and non-timeseries datasets.

A further advantage of embodiments herein may be understood to be how consecutive timeseries anomalies may be collated as a single anomaly.

Yet another advantage of embodiments herein may be understood to be that the first node may be understood to not impose any restriction on the underlying outlier detection method or seasonality residual extraction used.

Furthermore, rules may be mapped to severity, so that anomalies may be prioritized accordingly.

Even in the absence of domain knowledge, by applying the principle behind the definition of an anomaly, if an outlier pertaining to a certain rule is occurring too frequently, then such occurrences are probably not anomalous all and hence may be whitelisted.

The first node 111 also may advantageously provide a method for handling unknown rules should they occur.

Moreover, even when concept drift occurs, the rules may still hold, since they are not based on static thresholds.

Figure 3:
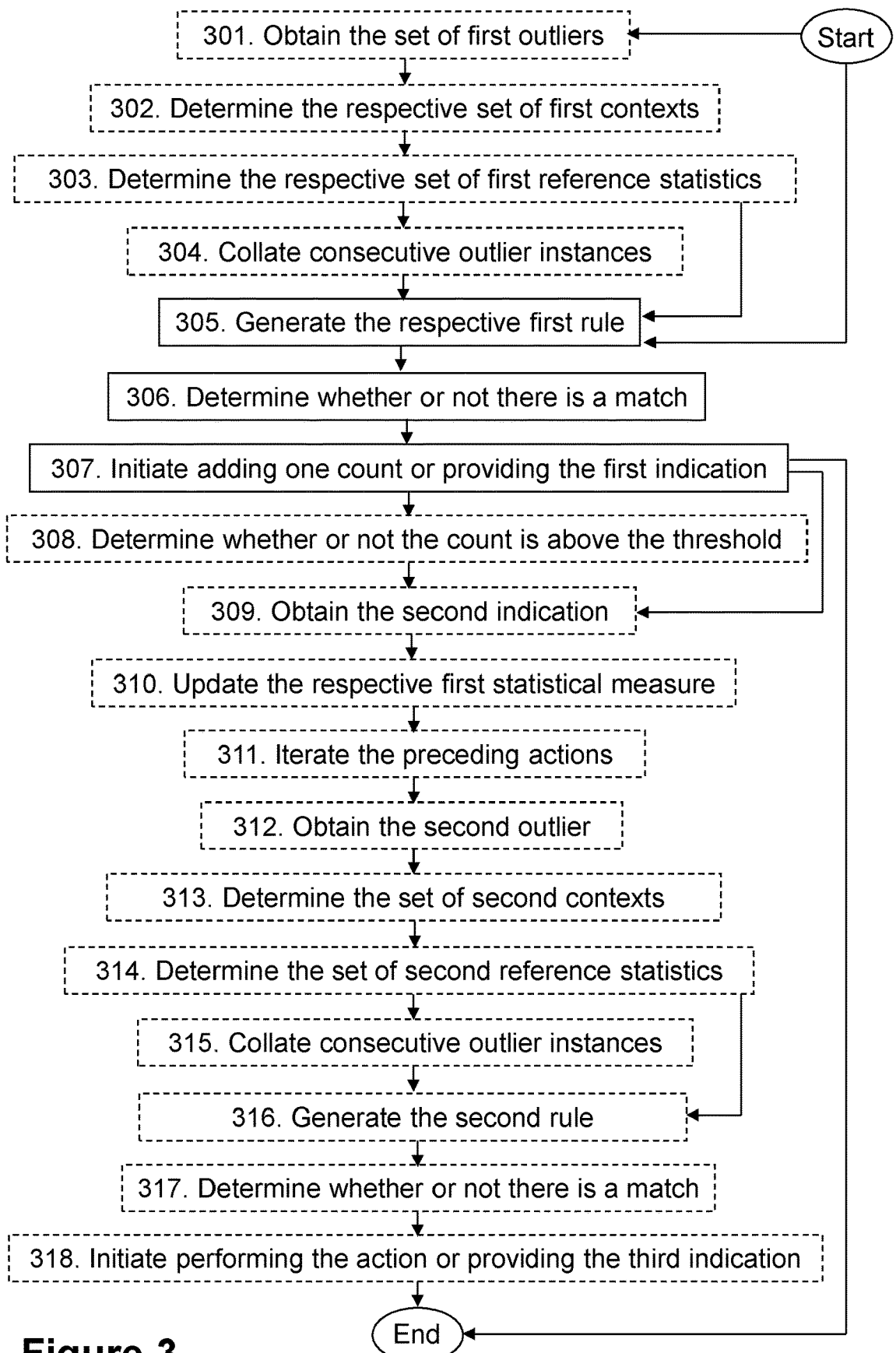
FIG. 3 is a flowchart depicting a method in a first node, according to embodiments herein.
Figure 9:
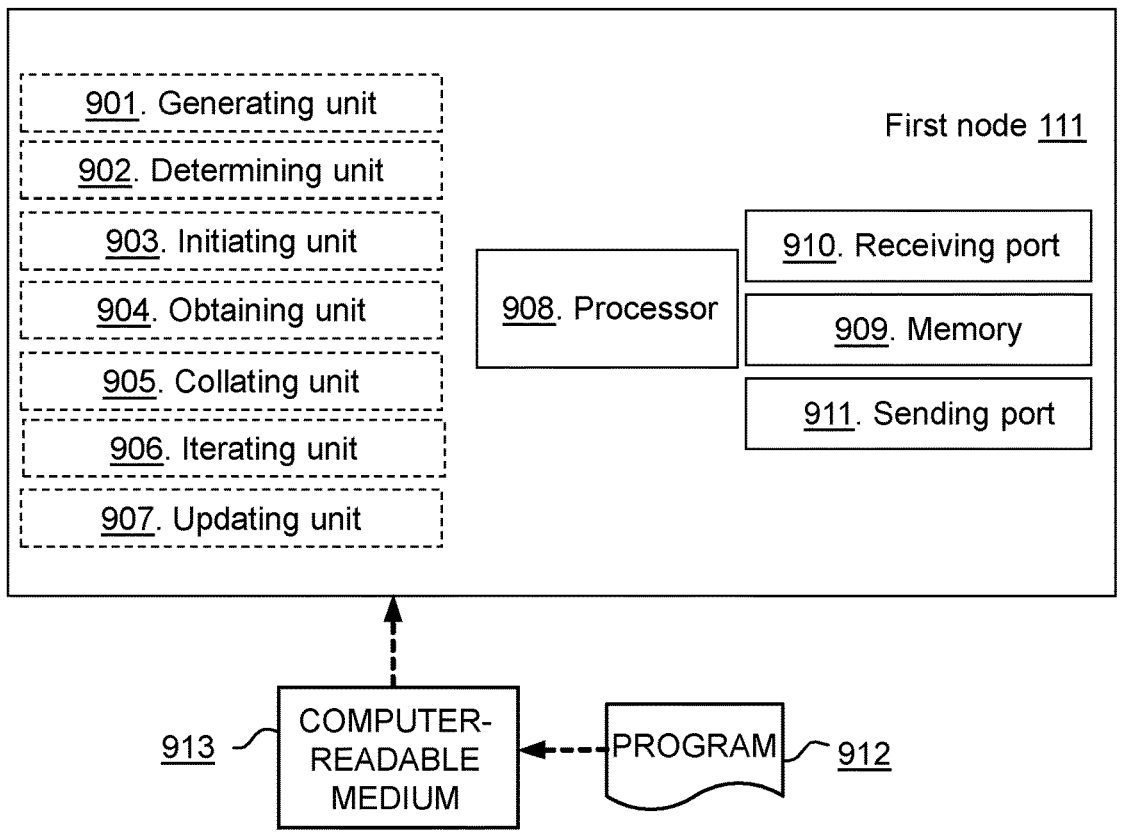
FIG. 9 is a schematic block diagram illustrating two non-limiting examples, a) and b), of a first node, according to embodiments herein.
Figure 9:
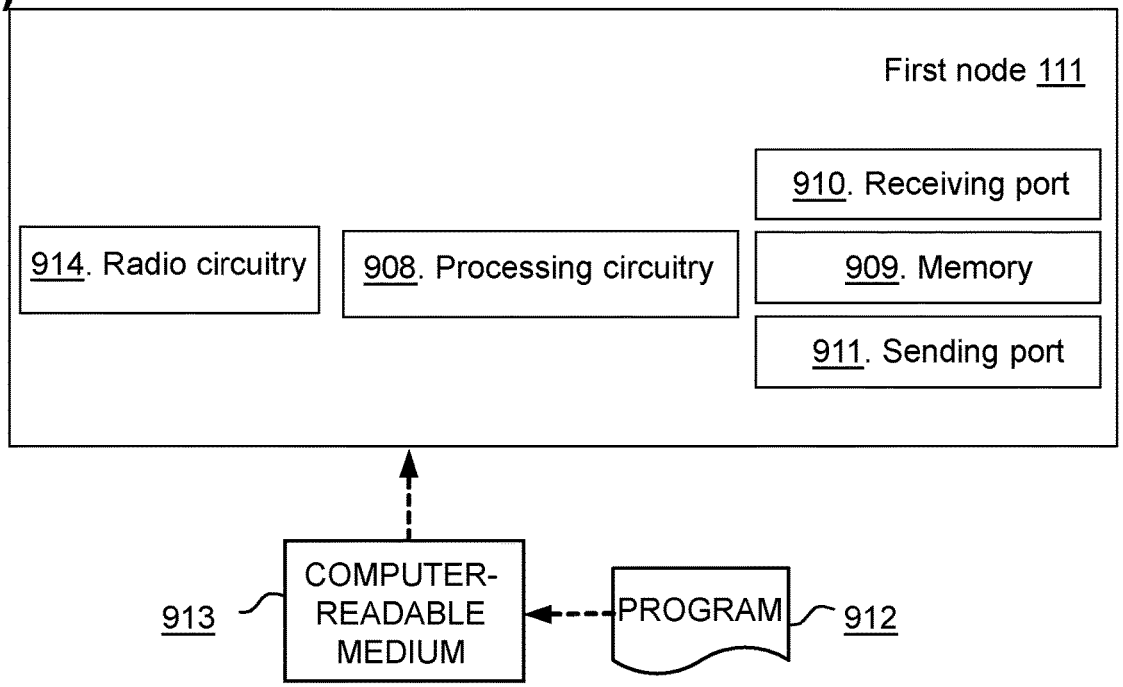

FIG. 9 depicts two different examples in panels a) and b), respectively, of the arrangement that the first node 111 may comprise to perform the method described in FIG. 3. In some embodiments, the first node 111 may comprise the following arrangement depicted in FIG. 9a. The first node 111 may be configured to operate in the communications system 100. The first node 111 may be understood to be for handling anomalous values.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 9, optional units are indicated with dashed boxes.

The detailed description of some of the following corresponds to the same references provided above, in relation to the actions described for the first node 111 and will thus not be repeated here. For example, the first node 111 may be configured to send the set of appraised rules configured to be gathered to e.g., the second node 112, to enable the second node 112 to run the rule matching or application phase with the outliers it may be configured to collect.

The first node 111 is configured to, e.g., by means of a generating unit 901 within the first node 111, configured to generate the respective first rule for each first outlier in the set of first outliers configured to be detected in the first plurality of data. Each respective first rule is configured to comprise the respective set of first conditions. Within each respective set of first conditions, each first condition is configured to compare the respective first value of the respective first variable of the respective first outlier in the set of first outliers to the corresponding respective first reference statistic for the respective first context configured to correspond to the respective first value of the respective first variable for the respective first outlier.

The first node 111 is further configured to, e.g., by means of a determining unit 902 within the first node 111, configured to determine, for each generated respective first rule, whether or not the generated respective first rule matches a previously unappraised rule.

In some embodiments, the first node 111 is further configured to, e.g., by means of an initiating unit 903 within the first node 111, configured to initiate performing one of: i) with the proviso that the generated respective first rule is determined to match a previously unappraised rule, adding one count of occurrence of the matched previously unappraised rule, and ii) providing, with the proviso that the generated respective first rule is determined to lack a match to a previously unappraised rule and to any previously appraised rule, the first indication. The first indication is configured to indicate the generated respective first rule is unappraised. In some embodiments, the first node 111 may be further configured to, e.g., by means of an obtaining unit 904 within the first node 111, configured to obtain the set of first outliers. Each first outlier may be configured to comprise the set of respective first values of the respective set of first variables. The respective first value of the respective first variable may be configured to be comprised in one of the sets of respective first values.

In some embodiments, the first node 111 may be further configured to, e.g., by means of the determining unit 902 within the first node 111, configured to determine the respective set of first contexts for each first outlier configured to be comprised in the set of first outliers. Each first context may be configured to correspond to the respective first value of the respective first variable. The respective first context may be configured to be comprised in one of the respective sets of first contexts.

In some embodiments, the first node 111 may be further configured to, e.g., by means of the determining unit 902 within the first node 111, configured to determine, for each respective set of first contexts, the respective set of first reference statistics using the respective set of first statistical measures. The respective first reference statistic may be configured to be determined for each first context using the respective first statistical measure for each first value. The respective first reference statistic may be configured to be comprised in one of the respective sets of first reference statistics.

In some embodiments, the generated respective first rules may be configured to be readable and explainable.

In some embodiments, any of the respective first rules and the second rule may be configured to be readable and explainable.

In some embodiments, the set of first outliers may be configured to comprise timeseries data, and the first node 111 may be further configured to, e.g., by means of a collating unit 905 within the first node 111, configured to collate consecutive outlier instances as a single outlier record. Consecutive outlier instances may be configured to be based on the time interval between occurrences. The respective first rule may be configured to be generated for each collated record. Each first condition may be configured to compare each observed value of each first field of the single outlier record to the corresponding determined first reference statistic for the determined respective first context configured to correspond to the respective first field.

In some embodiments, the first indication the configured to be provided to another node 114, and the first node 111 may be further configured to, e.g., by means of the obtaining unit within the first node 111, configured to obtain, based on the provided first indication, the second indication from the another node 114. The second indication may be configured to indicate the generated respective first rule may be one of: a) appraised and assigned to an action, b) whitelisted, c) combined and d) split.

In some embodiments, the first indication the configured to be provided to another node 114, and the first node 111 may be further configured to, e.g., by means of an iterating unit 906 within the first node 111, configured to iterate, during the training phase, the preceding actions 301, 302, 303, 304, 305, 306, 307, 309 to obtain the plurality of further appraised rules and respective assigned actions, to append to the set of previously appraised rules.

In some embodiments, the first node 111 may be further configured to, e.g., by means of the obtaining unit 904 within the first node 111, configured to obtain, after conclusion of the training phase, the second outlier configured to be detected in the second plurality of data. The second outlier may be configured to comprise the set of second values of the set of second variables.

In some embodiments, the first node 111 may be further configured to, e.g., by means of the determining unit 902 within the first node 111, configured to determine the set of second contexts of the second outlier. Each second context may be configured to correspond to the respective second value of the respective second variable.

In some embodiments, the first node 111 may be further configured to, e.g., by means of the determining unit 902 within the first node 111, configured to determine, for the set of second contexts, the set of second reference statistics using the set of second statistical measures. The respective second reference statistic may be configured to be determined for each second context using the respective second statistical measure for each second value.

The first node 111 may be configured to, e.g., by means of the generating unit 901 within the first node 111, configured to generate the second rule for the second outlier. The second rule may be configured to comprise the second set of conditions. Each second condition may be configured to compare the second value of the second variable of the obtained second outlier to the determined second reference statistic for the respective second context corresponding to the second value of the second variable of the second outlier.

In some embodiments, the first node 111 may be further configured to, e.g., by means of the determining unit 902 within the first node 111, configured to determine whether or not the generated second rule matches any of the previously appraised rules and respective assigned actions.

In some embodiments, the first node 111 may be further configured to, e.g., by means of the initiating unit 903 within the first node 111, configured to initiate performing one of the following. According to the first option, with the proviso that the generated second rule matches at least one of the previously appraised rules, the respective assigned action. According to the second option, with the proviso that the generated second rule lacks a match to any of the previously appraised rules and to any previously unappraised rule, providing the third indication. The third indication may be configured to indicate the generated third rule may be unappraised In some embodiments, the second outlier may be configured to comprise timeseries data, and the first node 111 may be further configured to, e.g., by means of the collating unit 905 within the first node 111, configured to collate the consecutive outlier instances as a single record. Consecutive outlier instances may be configured to be based on the time interval between occurrences. The second rule may be configured to be generated for a collated record. Each second condition may be configured to compare each observed value of each second field of the single record to the corresponding determined second reference statistic for the determined respective second context corresponding to the respective second field.

In some embodiments wherein the set of first outliers may be configured to comprise timeseries data, and the first node 111 may be further configured to, e.g., by means of the determining unit 902 within the first node 111, configured to determine whether or not the count of occurrence of the matched previously unappraised rule may be above the threshold and whitelist the matched previously unappraised rule with the proviso the count may be determined to exceed the threshold.

In some embodiments, the first node 111 may be further configured to, e.g., by means of an updating unit 907 within the first node 111, configured to update the respective first statistical measure. The determining of the second reference statistic may be configured to be based on the updated respective first statistical measure. The iterating may be further configured to comprise iterating the updating.

In some embodiments, each of the previously appraised rules may be configured to have the priority level assigned. The initiating of the performance of the respective assigned action may be further configured to be based on the respective priority level configured to be assigned to the previously appraised rule matching the second rule.

In some embodiments, the first context may be configured to comprise at least one of: the time period when the respective first outlier was detected, the region wherein the respective first outlier was detected, the cell wherein the respective first outlier was detected and the performance indicator for which the respective first outlier was respectively detected.

In some embodiments, the first node 111 may be operating in the communications system 100, any of the set of first outliers and the second outlier may be obtained from a third node 113 operating in the communications system 100.

In some embodiments, the first node 111 may be configured to perform any of the Actions 301-318 online.

In some embodiments, the obtaining of the second outlier, the determining of the set of second contexts of the second outlier, the determining of the set of second reference statistics, the generating of the second rule, the determining of whether or not the generated second rule matches any of the previously appraised rules and respective assigned actions, and the initiating of the performing of the assigned action or providing the third indication, may be configured to be performed online.

The embodiments herein in the first node 111 may be implemented through one or more processors, such as a processor 908 in the first node 111 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 909 comprising one or more memory units. The memory 909 is arranged to be used to store obtained information, store data, configurations, schedulings, and applications etc. to perform the methods herein when being executed in the first node 111.

In some embodiments, the first node 111 may receive information from, e.g., any of the second node 112, the third node 113, the another node 114, the radio network node 130, and/or the device 150 through a receiving port 910. In some embodiments, the receiving port 910 may be, for example, connected to one or more antennas in first node 111. In other embodiments, the first node 111 may receive information from another structure in the communications system 100 through the receiving port 910. Since the receiving port 910 may be in communication with the processor 908, the receiving port 910 may then send the received information to the processor 908. The receiving port 910 may also be configured to receive other information.

The processor 908 in the first node 111 may be further configured to transmit or send information to e.g., any the second node 112, the third node 113, the another node 114, the radio network node 130, the device 150 and/or another structure in the communications system 100, through a sending port 911, which may be in communication with the processor 908, and the memory 909.

Those skilled in the art will also appreciate that the units 901-907 described above may refer to a combination of analog and digital circuits, and/or one or more processors configured with software and/or firmware, e.g., stored in memory, that, when executed by the one or more processors such as the processor 908, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-907 described above may be implemented as one or more applications running on one or more processors such as the processor 908.

Thus, the methods according to the embodiments described herein for the first node 111 may be respectively implemented by means of a computer program 912 product, comprising instructions, i.e., software code portions, which, when executed on at least one processor 908, cause the at least one processor 908 to carry out the actions described herein, as performed by the first node 111. The computer program 912 product may be stored on a computer-readable storage medium 913. The computer-readable storage medium 913, having stored thereon the computer program 912, may comprise instructions which, when executed on at least one processor 908, cause the at least one processor 908 to carry out the actions described herein, as performed by the first node 111. In some embodiments, the computer-readable storage medium 913 may be a non-transitory computer-readable storage medium, such as a CD ROM disc, or a memory stick. In other embodiments, the computer program 912 product may be stored on a carrier containing the computer program 912 just described, wherein the carrier is one of an electronic signal, optical signal, radio signal, or the computer-readable storage medium 913, as described above.

The first node 111 may comprise a communication interface configured to facilitate, or an interface unit to facilitate, communications between the first node 111 and other nodes or devices, e.g., any the second node 112, the third node 113, the another node 114, the radio network node 130, the device 150 and/or another structure in the communications system 100. The interface may, for example, include a transceiver configured to transmit and receive radio signals over an air interface in accordance with a suitable standard.

In other embodiments, the first node 111 may comprise the following arrangement depicted in FIG. 9b. The first node 111 may comprise a processing circuitry 908, e.g., one or more processors such as the processor 908, in the first node 111 and the memory 909. The first node 111 may also comprise a radio circuitry 914, which may comprise e.g., the receiving port 910 and the sending port 911. The processing circuitry 908 may be configured to, or operable to, perform the method actions according to FIG. 3, FIG. 5, FIG. 6, FIG. 7, and/or FIG. 8, in a similar manner as that described in relation to FIG. 9a. The radio circuitry may be configured to set up and maintain at least a wireless connection with the any the second node 112, the third node 113, the another node 114, the radio network node 130, the device 150 and/or another structure in the communications system 100. Circuitry may be understood herein as a hardware component.

Hence, embodiments herein also relate to the first node 111 operative to operate in the communications system 100. The first node 111 may comprise the processing circuitry 908 and the memory 909, said memory 909 containing instructions executable by said processing circuitry 908, whereby the first node 111 is further operative to perform the actions described herein in relation to the first node 111, e.g., in FIG. 3, FIG. 5, FIG. 6, FIG. 7, and/or FIG. 8.

Figure 10:
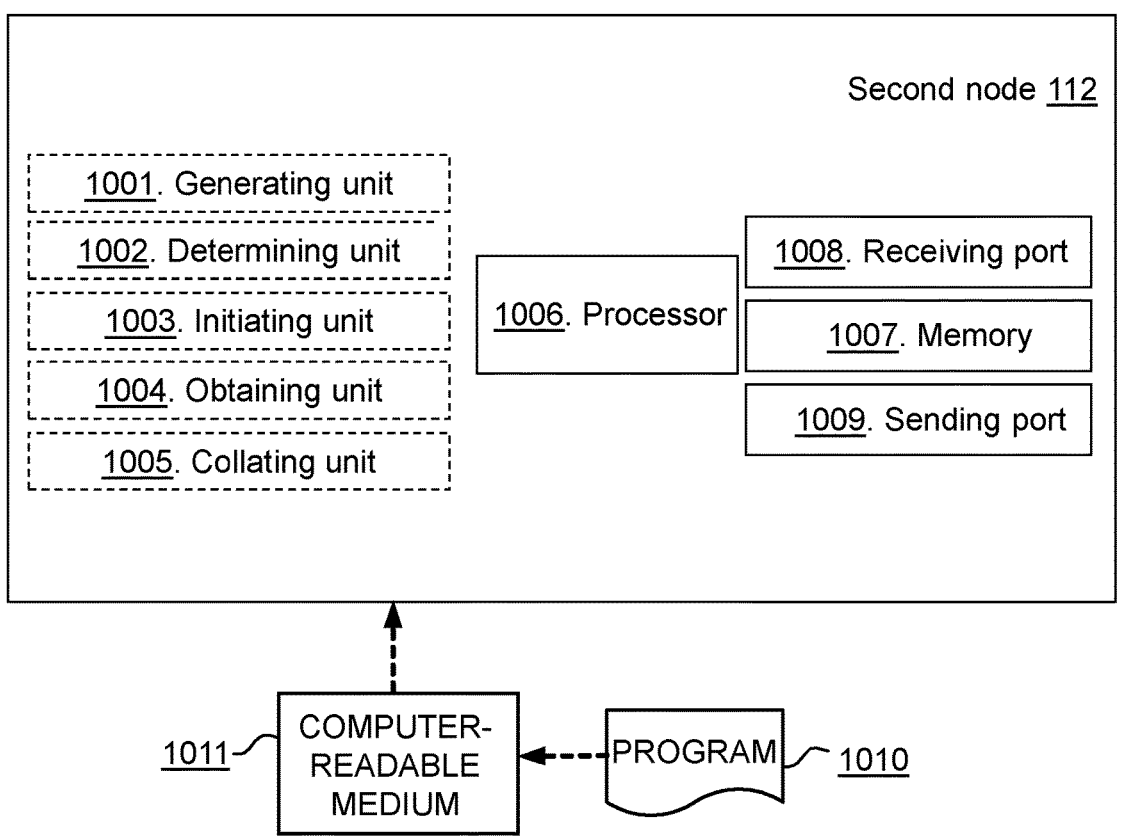
FIG. 10 is a schematic block diagram illustrating two non-limiting examples, a) and b), of a second node, according to embodiments herein.
Figure 10:
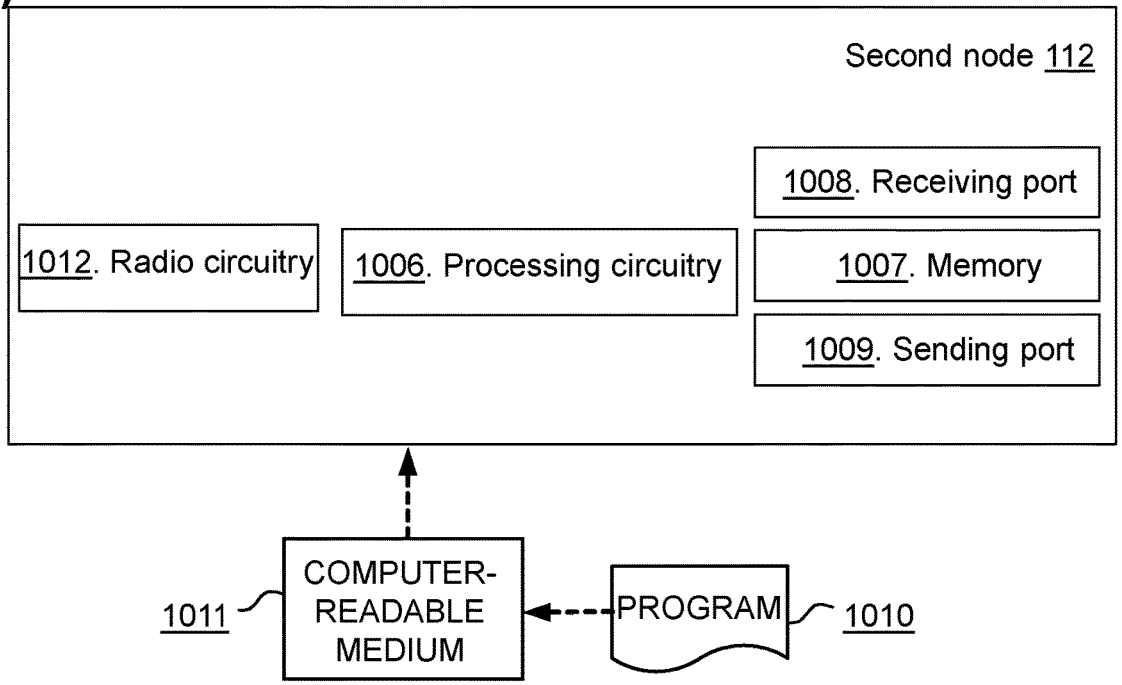

FIG. 10 depicts two different examples in panels a) and b), respectively, of the arrangement that the second node 112 may comprise to perform the method described in FIG. 4, FIG. 5 and/or FIG. 8. In some embodiments, the second node 112 may comprise the following arrangement depicted in FIG. 10a. The second node 112 may be configured to operate in the communications system 100. The second node 112 may be understood to be for handling anomalous values.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 10, optional units are indicated with dashed boxes.

The detailed description of some of the following corresponds to the same references provided above, in relation to the actions described for the second node 112 and will thus not be repeated here. For example, the first node 111 may be configured to send the set of appraised rules configured to be gathered to e.g., the second node 112, to enable the second node 112 to run the rule matching or application phase with the outliers it may be configured to collect.

The second node 112 is configured to, e.g., by means of a generating unit 1001 within the second node 112, configured to generate the second rule for the second outlier configured to be detected in the second plurality of data. The second rule may be configured to comprise the second set of conditions. Each second condition may be configured to compare the second value of the second variable of the second outlier to the determined second reference statistic for the respective second context configured to correspond the second value of the second variable of the second outlier.

The second node 112 is further configured to, e.g., by means of a determining unit 1002 within the second node 112, configured to determine whether or not the generated second rule matches any previously appraised rule and respective assigned actions configured to be obtained from the first node 111.

In some embodiments, the second node 112 is further configured to, e.g., by means of an initiating unit 1003 within the second node 112, configured to initiate performing one of the following. According to the first option, with the proviso that the generated second rule matches at least one of the previously appraised rules, the respective assigned action. According to the second option, with the proviso that the generated second rule lacks a match to any of the previously appraised rules and to any previously unappraised rule, providing the third indication. The third indication may be configured to indicate the generated third rule may be unappraised.

In some embodiments, the second node 112 may be further configured to, e.g., by means of an obtaining unit 1004 within the second node 112, configured to obtain the second outlier. The second outlier may be configured to comprise the set of second values of the set of second variables. The second value of the second variable may be configured to comprise in the set of second values.

In some embodiments, the second node 112 may be further configured to, e.g., by means of the determining unit 1002 within the second node 112, configured to determine the set of second contexts of the second outlie. Each second context may be configured to correspond to the respective second value of the respective second variable. Each second context may be configured to correspond to the respective second value of the respective second variable. The respective second context may be configured to be comprised in the set of second contexts.

In some embodiments, the second node 112 may be further configured to, e.g., by means of the determining unit 1002 within the second node 112, configured to determine, for the set of second contexts, the set of second reference statistics using the set of second statistical measures. The respective second reference statistic may be configured to be determined for each second context using the respective second statistical measure for each second value. The respective second reference statistic may be configured to be comprised in the set of second reference statistics.

In some embodiments, the second rule may be configured to be readable and explainable.

In some embodiments, the second outlier may be configured to comprise timeseries data, and the second node 112 may be further configured to, e.g., by means of a collating unit 1005 within the second node 112, configured to collate the consecutive outlier instances as a single record. Consecutive outlier instances may be configured to be based on the time interval between occurrences. The second rule may be configured to be generated for a collated record. Each second condition may be configured to compare each observed value of each second field of the single record to the corresponding determined second reference statistic for the determined respective second context configured to correspond to the respective second field.

In some embodiments, the second context may be configured to comprise at least one of: the time period when the second outlier was detected, the region wherein the second outlier was detected, the cell wherein the second outlier was detected and the performance indicator for which the second outlier was respectively detected.

In some embodiments, the first node 111 may be operating in the communications system 100, and the second outlier may be configured to be obtained from the third node 113 configured to be operating in the communications system 100.

In some embodiments, the second node 112 may be configured to perform any of the Actions 401-407 online.

In particular embodiments, the obtaining of the second outlier, the determining of the set of second contexts of the second outlier, the determining of the set of second reference statistics, the generating of the second rule, the determining of whether or not the generated second rule matches any of the previously appraised rules and respective assigned actions, and the initiating of the performing of the assigned action or providing the third indication, may be configured to be performed online.

The embodiments herein in the second node 112 may be implemented through one or more processors, such as a processor 1006 in the second node 112 depicted in FIG. 10*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1007 comprising one or more memory units. The memory 1007 is arranged to be used to store obtained information, store data, configurations, schedulings, and applications etc. to perform the methods herein when being executed in the second node 112.

In some embodiments, the second node 112 may receive information from, e.g., any of the first node 111, the third node 113, the another node 114, the radio network node 130, and/or the device 150 through a receiving port 1008. In some embodiments, the receiving port 1008 may be, for example, connected to one or more antennas in second node 112. In other embodiments, the second node 112 may receive information from another structure in the communications system 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the second node 112 may be further configured to transmit or send information to e.g., any the first node 111, the third node 113, the another node 114, the radio network node 130, the device 150 and/or another structure in the communications system 100, through a sending port 1009, which may be in communication with the processor 1006, and the memory 1007.

Those skilled in the art will also appreciate that the units 1001-1005 described above may refer to a combination of analog and digital circuits, and/or one or more processors configured with software and/or firmware, e.g., stored in memory, that, when executed by the one or more processors such as the processor 1006, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1001-1005 described above may be implemented as one or more applications running on one or more processors such as the processor 1006.

Thus, the methods according to the embodiments described herein for the second node may be respectively implemented by means of a computer program 1010 product, comprising instructions, i.e., software code portions, which, when executed on at least one processor 1006, cause the at least one processor 1006 to carry out the actions described herein, as performed by the second node 112. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the second node 112. In some embodiments, the computer-readable storage medium 1011 may be a non-transitory computer-readable storage medium, such as a CD ROM disc, or a memory stick. In other embodiments, the computer program 1010 product may be stored on a carrier containing the computer program 1010 just described, wherein the carrier is one of an electronic signal, optical signal, radio signal, or the computer-readable storage medium 1011, as described above.

The second node 112 may comprise a communication interface configured to facilitate, or an interface unit to facilitate, communications between the second node 112 and other nodes or devices, e.g., any the first node 111, the third node 113, the another node 114, the radio network node 130, the device 150 and/or another structure in the communications system 100. The interface may, for example, include a transceiver configured to transmit and receive radio signals over an air interface in accordance with a suitable standard.

In other embodiments, the second node 112 may comprise the following arrangement depicted in FIG. 10b. The second node 112 may comprise a processing circuitry 1006, e.g., one or more processors such as the processor 1006, in the second node 112 and the memory 1007. The second node 112 may also comprise a radio circuitry 1012, which may comprise e.g., the receiving port 1008 and the sending port 1009. The processing circuitry 1006 may be configured to, or operable to, perform the method actions according to FIG. 4, FIG. and/or FIG. 8, in a similar manner as that described in relation to FIG. 10a. The radio circuitry 1012 may be configured to set up and maintain at least a wireless connection with the any the first node 111, the third node 113, the another node 114, the radio network node 130, the device 150 and/or another structure in the communications system 100. Circuitry may be understood herein as a hardware component.

Hence, embodiments herein also relate to the second node 112 operative to operate in the communications system 100. The second node 112 may comprise the processing circuitry and the memory 1007, said memory 1007 containing instructions executable by said processing circuitry 1006, whereby the second node 112 is further operative to perform the actions described herein in relation to the second node 112, e.g., FIG. 4, FIG. 5 and/or FIG. 8.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

REFERENCES LIST

1. Overview of Time Series Characteristics, Penn State Eberly College of Science. Link: https://online.stat.psu.edu/stat510/lesson/i/1.1
2. Forecasting: Principles and Practice, Rob J Hyndman and George Athanasopoulos. Section 6.6 STL Decomposition, link: https://otexts.com/fpp2/stl.html
3. SHAP: Lundberg, Scott M., and Su-In Lee. "A unified approach to interpreting model predictions." In Proceedings of the 31st International conference on neural information processing systems, pp. 4768-4777. 2017. Link https://arxiv.org/pdf/1705.07874.pdf
4. LIME: Ribeiro, Marco Tulio, Sameer Singh, and Carlos Guestrin. "Why should i trust you?: Explaining the predictions of any classifier." Proceedings of the 22nd ACM SIGKDD International Conference on Knowledge Discovery and Data Mining. ACM, 2016. Link: https://arxiv.org/pdf/1602.04938.pdf 5. Surrogate Model: Christoph Molnar. "Interpretable Machine Learning." September 2021. Creative Commons License. Link: https://christophm.github.io/interpretable-ml-book/global.html
6. Prathibhamol, C. P., G. S. Amala, and Malavika Kapadia. "Anomaly detection based multi label classification using Association Rule Mining (ADMLCAR)." 2016 International Conference on Advances in Computing, Communications and Informatics (ICACCI). IEEE, 2016. RG Link.
7. Tsang, Chi-Ho, Sam Kwong, and Hanli Wang. "Genetic-fuzzy rule mining approach and evaluation of feature selection techniques for anomaly intrusion detection." Pattern Recognition 40.9, Elsevier (2007): 2373-2391. Link: https://sci2s.ugr.es/keel/pdf/specific/articulo/scopus09.pdf
8. Liu, Yu, et al. "A hybrid data mining anomaly detection technique in ad hoc networks." International Journal of Wireless and Mobile Computing 2.1 (2007): 37-46. Link: https://doi.org/10.1504/IJWMC.2007.013794
9. Bruno, Giulia, Paolo Garza, and Elisa Quintarelli. "Mining rare association rules by discovering quasi-functional dependencies: an incremental approach." Rare Association Rule Mining and Knowledge Discovery: Technologies for Infrequent and Critical Event Detection. IGI Global, 2010. 131-149. Link: https://doi.org/10.4018/978-1-60566-754-6.ch009
10. Jääskelä, Jari. "Anomaly-Based Insider Threat Detection with Expert Feedback and Descriptions." (2020). Link: https://core.ac.uk/reader/344909640
11. Liu, Kun, et al. "An Interactive Approach of Rule Mining and Anomaly Detection for Internal Risks." International Conference on Harmony Search Algorithm. Springer, Singapore, 2020. Link: https://link.springer.com/chapter/10.1007/978-981-15-8603-3 32
12. Steenwinckel, Bram, et al. "FLAGS: A methodology for adaptive anomaly detection and root cause analysis on sensor data streams by fusing expert knowledge with machine learning." Future Generation Computer Systems 116 (2021): 30-48. Link: https://www.sciencedirect.com/science/article/pii/S0167739X20329927.
13. Ebenezer R H P Isaac. "Adaptive Thresholding Heuristic for Anomaly Detection." Worldwide Patent No. WO2021176460A1. Published in 2021. WIPO Link: https://patentscope.wipo.int/search/en/detail.jsf?docId=WO2021176460, Google Patents Link: https://patents.google.com/patent/WO2021176460A1/

The invention claimed is:

1. A method of operation by a computer node associated with a cellular network, the method comprising:
receiving input data comprising a vector of values for a set of key performance indicators (KPIs) computed for a cell of the cellular network, wherein the vector of values comprises a combination of values flagged as being anomalous by an outlier detector that performs statistical processing of performance measurements taken for the cellular network, and wherein each value characterizes a condition of a respective one in the set of KPIs for one or more time intervals with respect to a corresponding expected value for the KPI, for the cell;
determining whether the received vector matches any one among a set of first vectors contained in a stored set of appraised rules, wherein each appraised rule maps a respective one among the set of first vectors to a corresponding expert-configured action for anomaly handling; and
responsive to the received vector not matching any in the set of first vectors, updating a stored set of unappraised rules for subsequent expert appraisal, the stored set of unappraised rules containing vectors previously received from the outlier detector for the cell or one or more other cells in the cellular network and not matched to any among the set of first vectors, and the updating comprising:
determining whether the received vector matches any of the previously received vectors contained in the stored set of unappraised rules and, responsive to finding a match, incrementing an occurrence count of the matched unappraised rule for tracking a frequency of occurrence, and otherwise, responsive to finding no match, adding a new unappraised rule to the stored set of unappraised rules, the new unappraised rule mapping the received vector to a default action.

2. The method according to claim 1, wherein, in association with adding the new unappraised rule to the stored set of unappraised rules, the method further includes initiating the default action contained in the new unappraised rule.

3. The method according to claim 2, wherein the default action comprises raising an alarm to alert a monitoring system or a network operator.

4. The method according to claim 1, wherein, in association with finding the match between the received vector and one of the previously received vectors, the method further includes, responsive to determining that the value of the occurrence count of the matched unappraised rule before incrementing is below a defined count value, initiating a default action specified by the matched unappraised rule.

5. The method according to claim 1, wherein, in association with incrementing the occurrence count of the matched unappraised rule for tracking the frequency of occurrence, the method further includes, in response to the incremented occurrence count meeting a defined count value, outputting an alert for triggering expert appraisal of the matched unappraised rule.

6. The method according to claim 1, further comprising, responsive to the received vector matching one of the first vectors in the set of first vectors, initiating, for the matched appraised rule, the corresponding expert-configured action for anomaly handling.

7. The method according to claim 6, further comprising incrementing an occurrence count for the matched appraised rule.

8. The method according to claim 7, further comprising, responsive to determining that the incremented occurrence count for the matched appraised rule meets a defined count value, outputting an alert for triggering expert re-appraisal of the matched appraised rule, the expert re-appraisal determining whether the matched appraised rule should be marked in the stored set of appraised rules as whitelisted, as corresponding to non-anomalous operation of the cellular network.

9. The method according to claim 1, wherein the stored set of appraised rules provides for selectively marking individual ones of the appraised rules as being whitelisted, and wherein, responsive to the received vector matching one of the first vectors in the set of first vectors, determining whether the matched appraised rule is whitelisted and, responsive to determining that the matched appraised rule is not whitelisted, initiating the corresponding expert-configured action, and otherwise not initiating the corresponding expert-configured action.

10. The method according to claim 1, wherein the vector of values comprises a numerical vector indicating a particular combination of KPI conditions for the set of KPIs, each KPI condition defined by comparison of the corresponding value in the vector of values to the corresponding expected value of the KPI, and wherein the stored set of appraised rules comprises expert-configured rules corresponding to different combinations of KPI conditions deemed by an expert as indicating anomalous operation in the cellular network.

11. A computer node configured for operation in association with a cellular network, the computer node comprising:
  memory storing computer program instructions; and
  a processor configured for executing the computer program instructions, whereby the computer node is caused to:
    receive input data comprising a vector of values for a set of key performance indicators (KPIs) computed for a cell of the cellular network, wherein the vector of values comprises a combination of values flagged as being anomalous by an outlier detector that performs statistical processing of performance measurements taken for the cellular network, and wherein each value characterizes a condition of a respective one in the set of KPIs for one or more time intervals with respect to a corresponding expected value for the KPI, for the cell;
    determine whether the received vector matches any one among a set of first vectors contained in a stored set of appraised rules, wherein each appraised rule maps a respective one among the set of first vectors to a corresponding expert-configured action for anomaly handling; and
    responsive to the received vector not matching any in the set of first vectors, update a stored set of unappraised rules for subsequent expert appraisal, the stored set of unappraised rules containing vectors previously received from the outlier detector for the cell or one or more other cells in the cellular network and not matched to any among the set of first vectors, and wherein to update the stored set of appraised rules, the computer node is caused to:
      determine whether the received vector matches any of the previously received vectors contained in the stored set of unappraised rules and, responsive to finding a match, increment an occurrence count of the matched unappraised rule for tracking a frequency of occurrence, and otherwise, responsive to finding no match, add a new unappraised rule to the stored set of unappraised rules, the new unappraised rule mapping the received vector to a default action.

12. The computer node according to claim 11, wherein, in association with adding the new unappraised rule to the stored set of unappraised rules, the computer node is caused to initiate the default action contained in the new unappraised rule.

13. The computer node according to claim 12, wherein the default action comprises raising an alarm to alert a monitoring system or a network operator.

14. The computer node according to claim 11, wherein, in association with finding the match between the received vector and one of the previously received vectors, the computer node is caused to evaluate the value of the occurrence count of the matched unappraised rule before incrementing and, in response to the value being below a defined count value, initiate a default action specified by the matched unappraised rule.

15. The computer node according to claim 11, wherein, in association with incrementing the occurrence count of the matched unappraised rule for tracking the frequency of occurrence, the computer node is caused to evaluate the incremented occurrence count of the matched unappraised rule, and, in response to the incremented occurrence count meeting a defined count value, output an alert for triggering expert appraisal of the matched unappraised rule.

16. The computer node according to claim 11, further comprising, responsive to the received vector matching one of the first vectors in the set of first vectors, the computer node is caused to initiate, for the matched appraised rule, the corresponding expert-configured action for anomaly handling.

17. The computer node according to claim 16, wherein the computer node is caused to increment an occurrence count for the matched appraised rule.

18. The computer node according to claim 17, wherein the computer node is caused to evaluate the incremented occurrence count for the matched appraised rule and, responsive to the incremented occurrence count for the matched appraised rule meeting a defined count value, output an alert for triggering expert re-appraisal of the matched appraised rule, the expert re-appraisal determining whether the matched appraised rule should be marked in the stored set of appraised rules as whitelisted as being non-anomalous.

19. The computer node according to claim 11, wherein the stored set of appraised rules provides for selectively marking individual ones of the appraised rules as being whitelisted, and wherein, responsive to the received vector matching one of the first vectors in the set of first vectors, the computer node is caused to determine whether the matched appraised rule is whitelisted and, responsive to determining that the matched appraised rule is not whitelisted, initiate the corresponding expert-configured action, and otherwise not initiate the corresponding expert-configured action.

20. The computer node according to claim 11, wherein the vector of values comprises a numerical vector indicating a particular combination of KPI conditions for the set of KPIs, each KPI condition defined by comparison of the corresponding value in the vector of values to the corresponding expected value of the KPI, and wherein the stored set of appraised rules comprises expert-configured rules corresponding to different combinations of KPI conditions deemed by an expert as indicating anomalous operation in the cellular network.

* * * * *